Sept. 10, 1940.  A. G. F. KUROWSKI  2,214,082
TYPEWRITING AND CALCULATING MACHINE
Original Filed Aug. 31, 1933    13 Sheets-Sheet 1

INVENTOR.
Alfred G. F. Kurowski.
BY L. G. Julihn
ATTORNEY.

Sept. 10, 1940.   A. G. F. KUROWSKI   2,214,082
TYPEWRITING AND CALCULATING MACHINE
Original Filed Aug. 31, 1933   13 Sheets-Sheet 2

INVENTOR.
Alfred G. F. Kurowski.
BY
*L. G. Julihn*
ATTORNEY.

Sept. 10, 1940.    A. G. F. KUROWSKI    2,214,082
TYPEWRITING AND CALCULATING MACHINE
Original Filed Aug. 31, 1933    13 Sheets-Sheet 3

INVENTOR
Alfred G. F. Kurowski.
BY
L. G. Julihn
ATTORNEY

Sept. 10, 1940. A. G. F. KUROWSKI 2,214,082
TYPEWRITING AND CALCULATING MACHINE
Original Filed Aug. 31, 1933   13 Sheets-Sheet 4
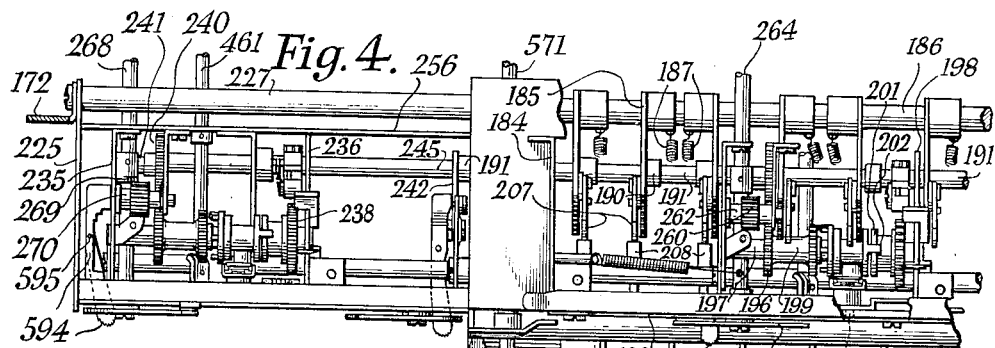
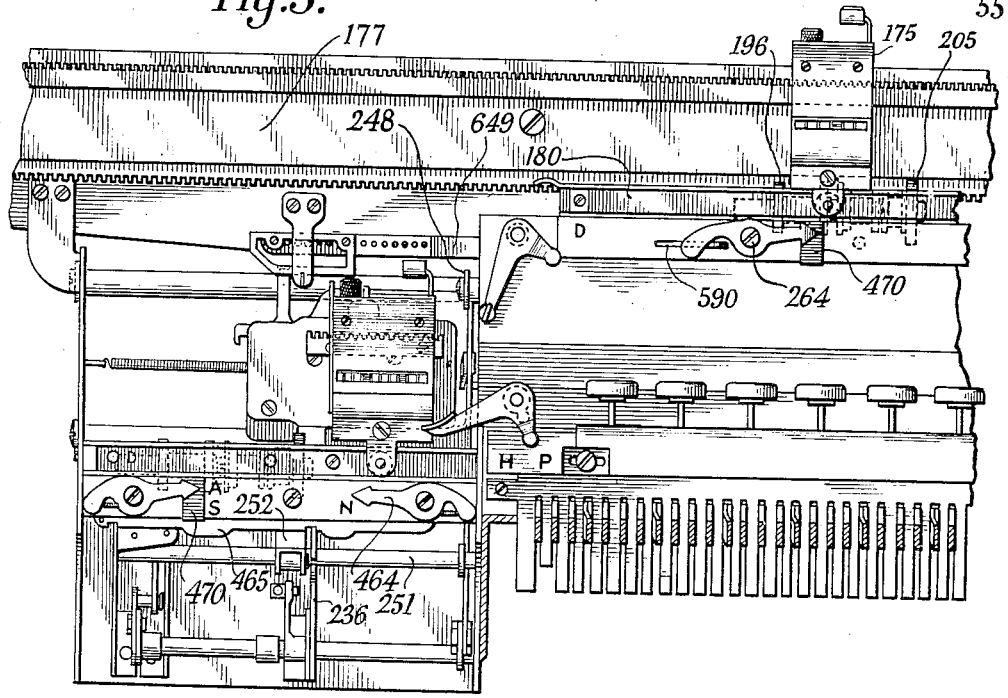
INVENTOR.
BY *Alfred G.F.Kurowski.*
*L. G. Julihn*
ATTORNEY.

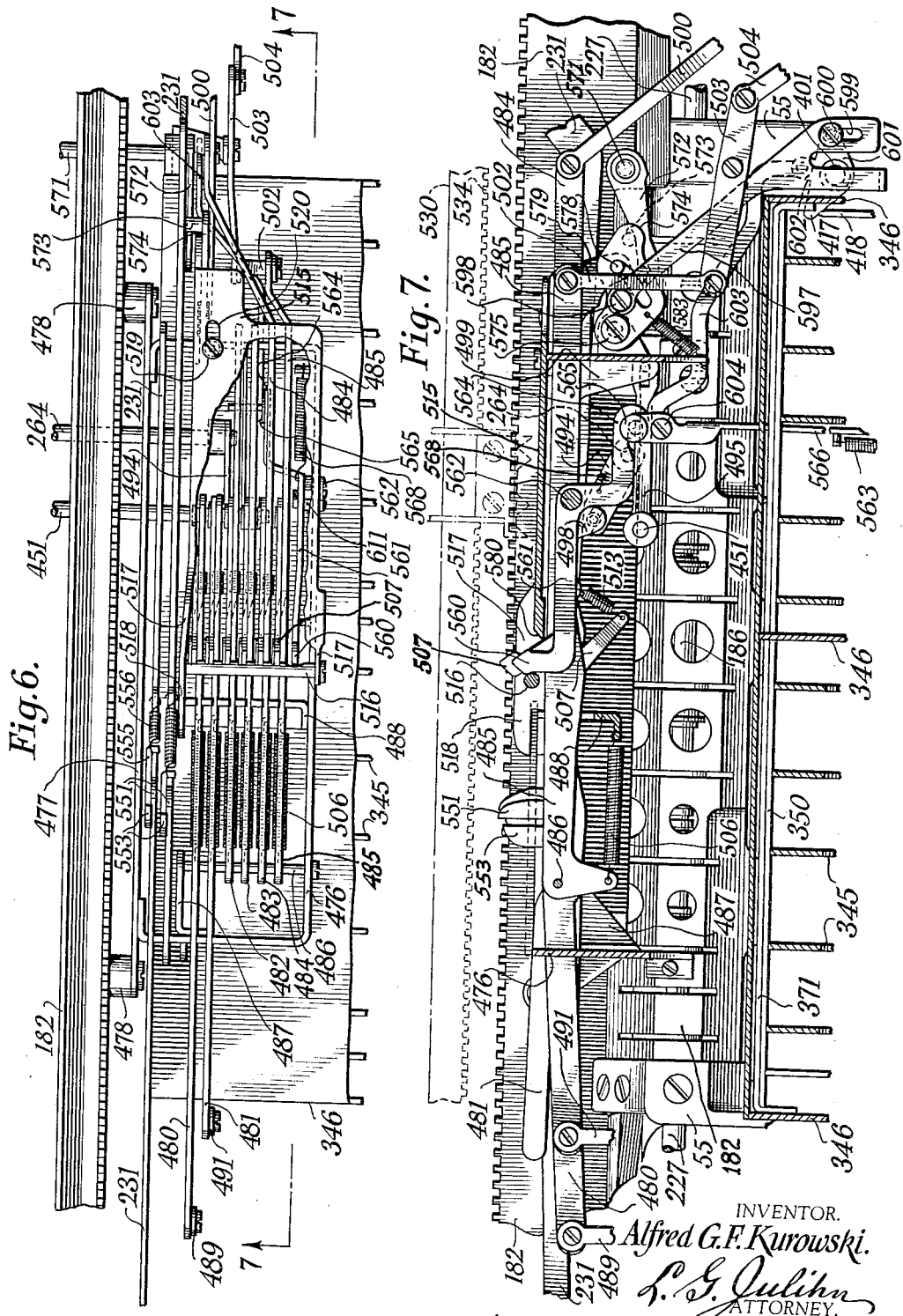

Sept. 10, 1940.   A. G. F. KUROWSKI   2,214,082
TYPEWRITING AND CALCULATING MACHINE
Original Filed Aug. 31, 1933   13 Sheets-Sheet 6
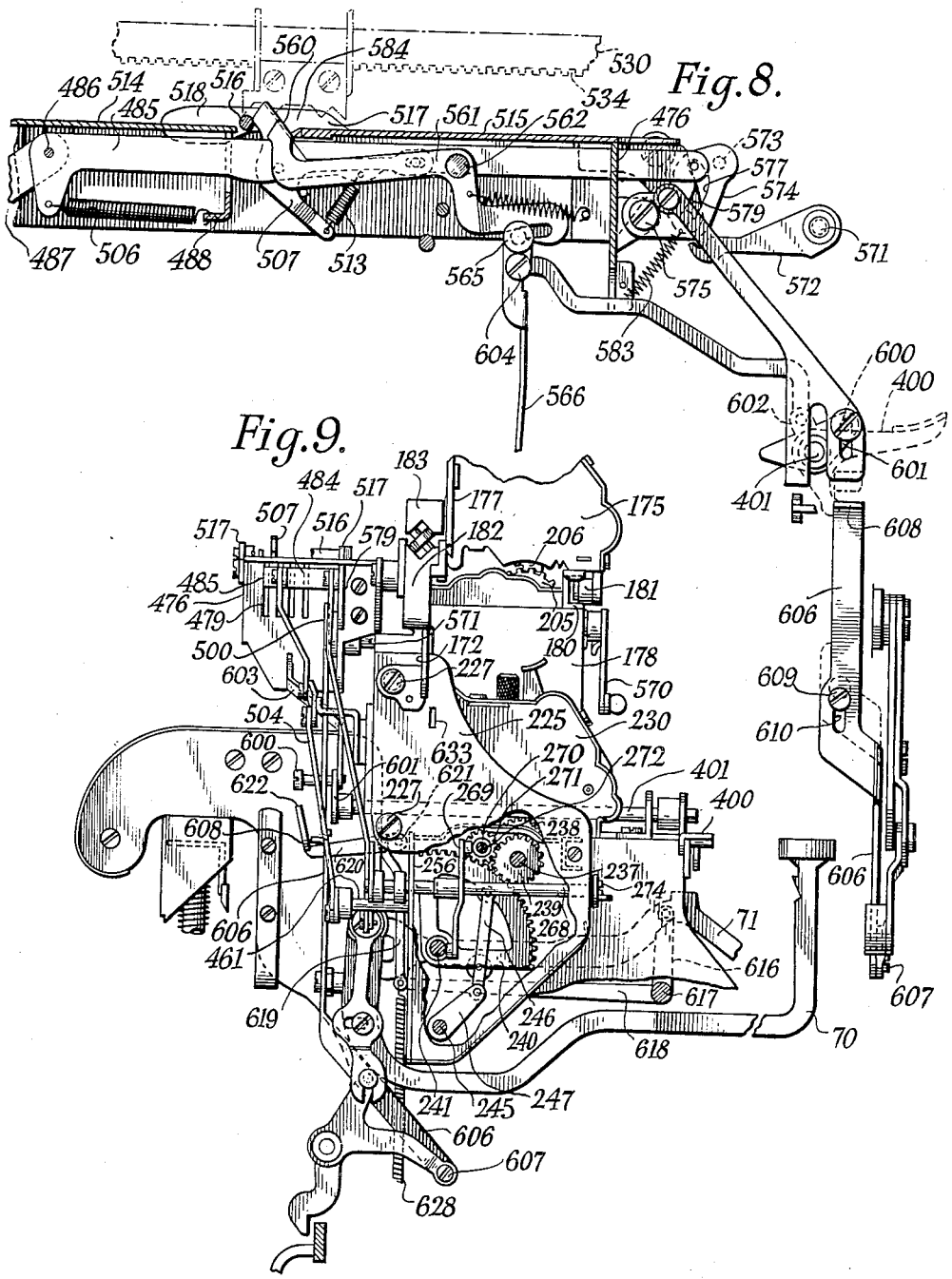
INVENTOR.
Alfred G. F. Kurowski.
BY
L. G. Julihn
ATTORNEY.

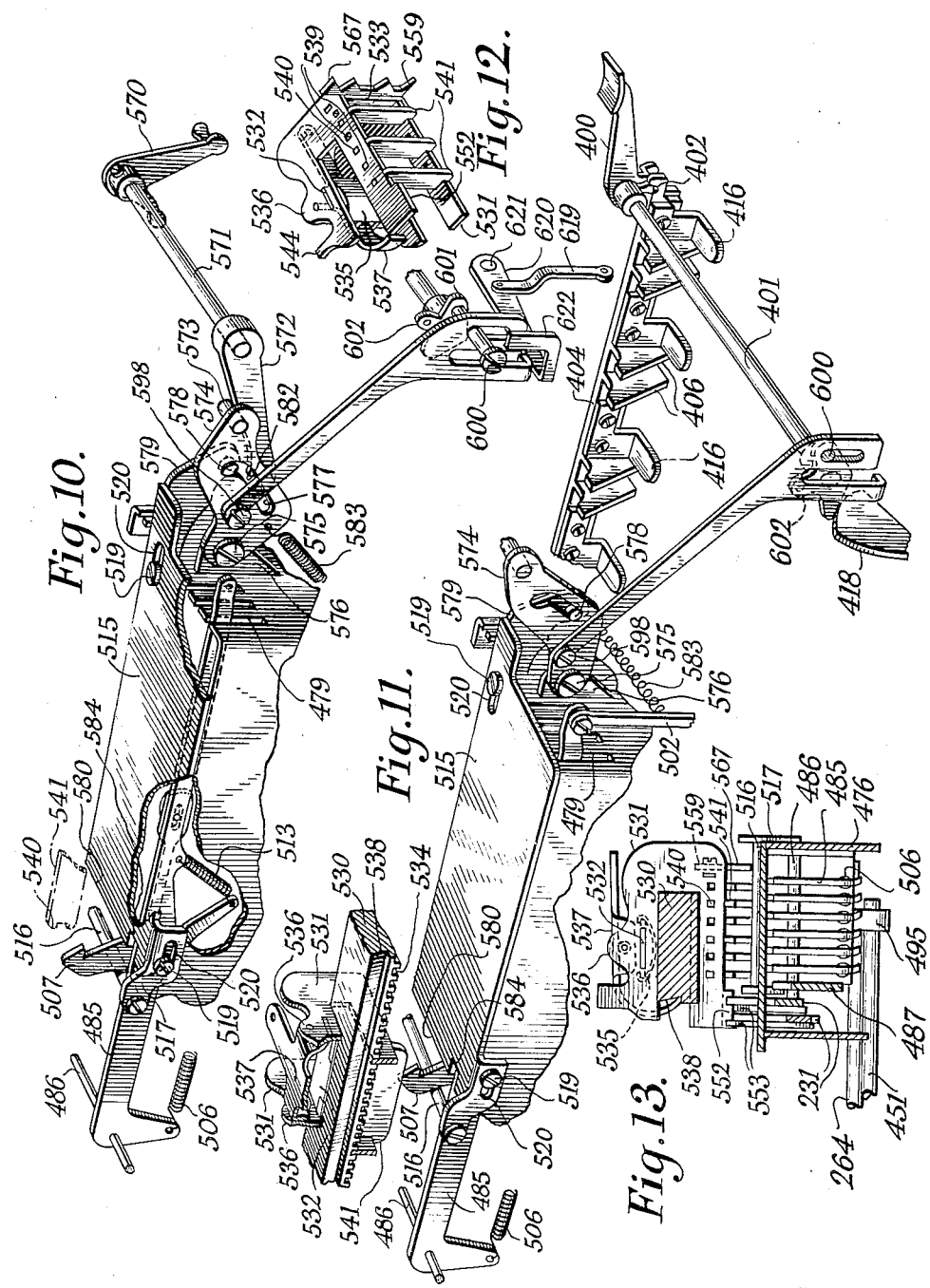

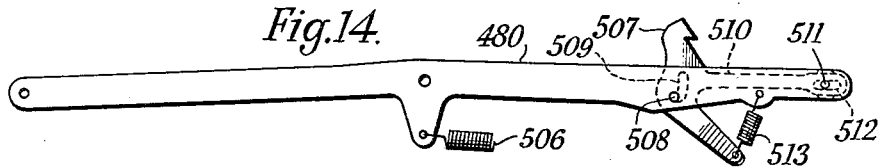
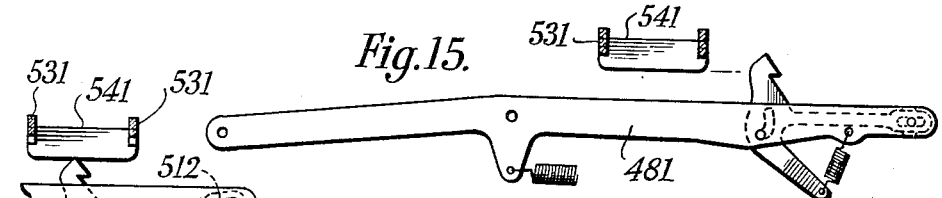
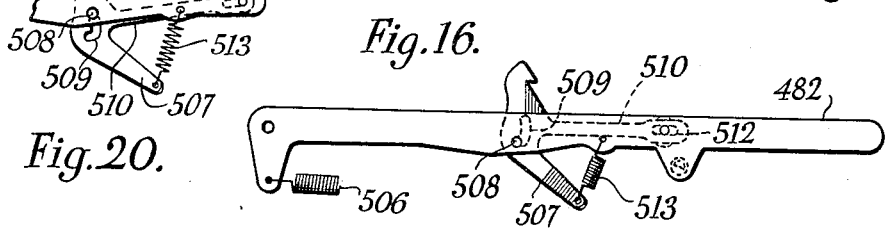
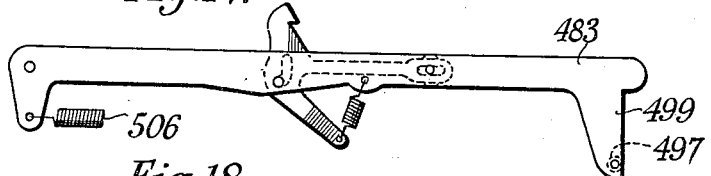
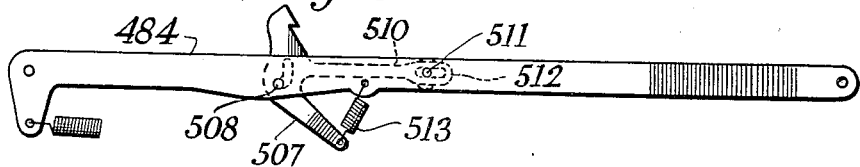
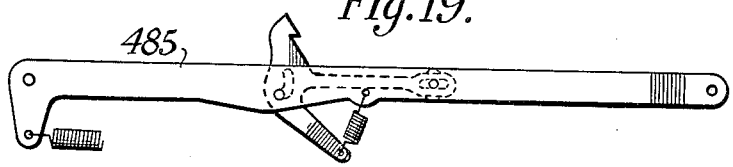

Sept. 10, 1940.  A. G. F. KUROWSKI  2,214,082
TYPEWRITING AND CALCULATING MACHINE
Original Filed Aug. 31, 1933  13 Sheets—Sheet 9
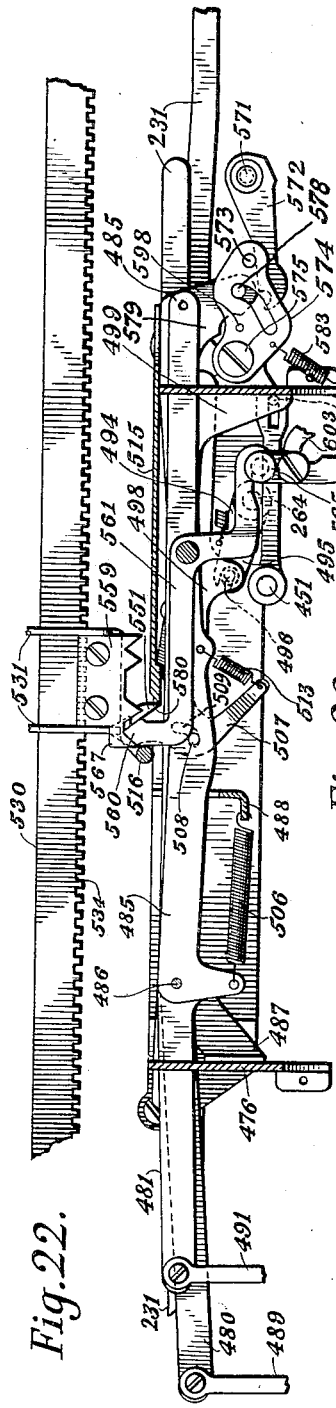
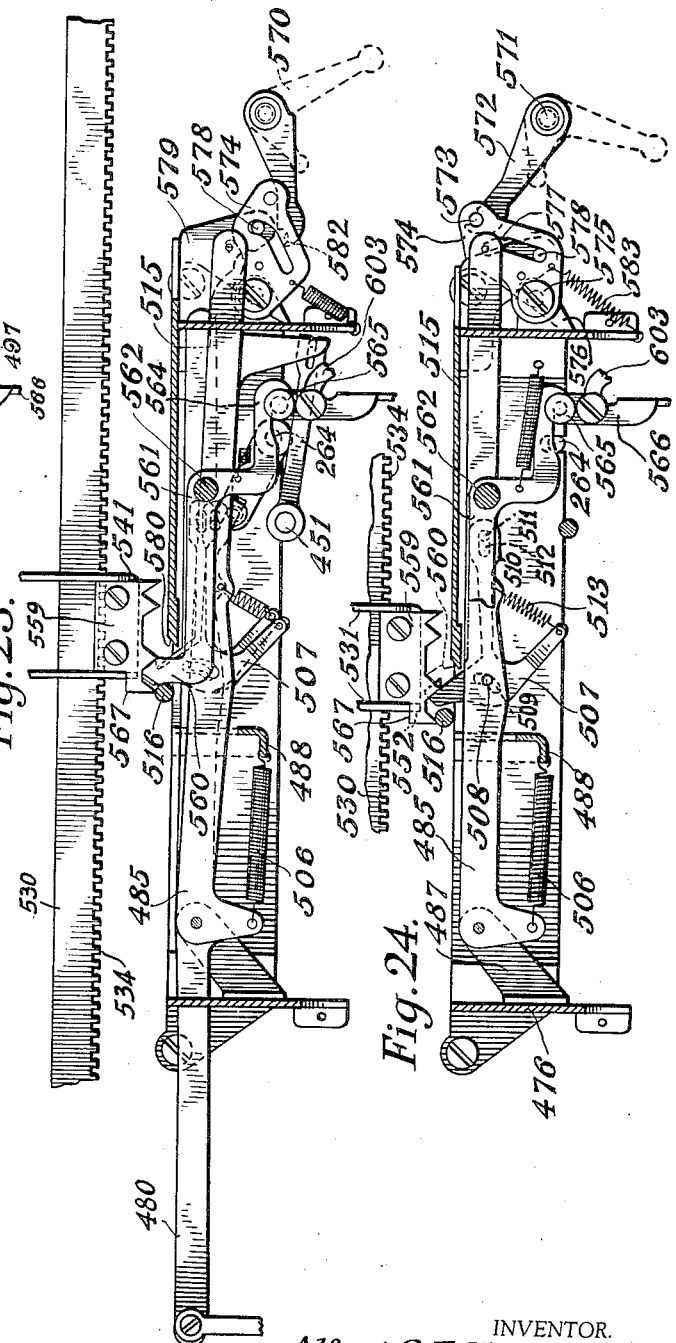
INVENTOR.
Alfred G.F. Kurowski.
BY
ATTORNEY.

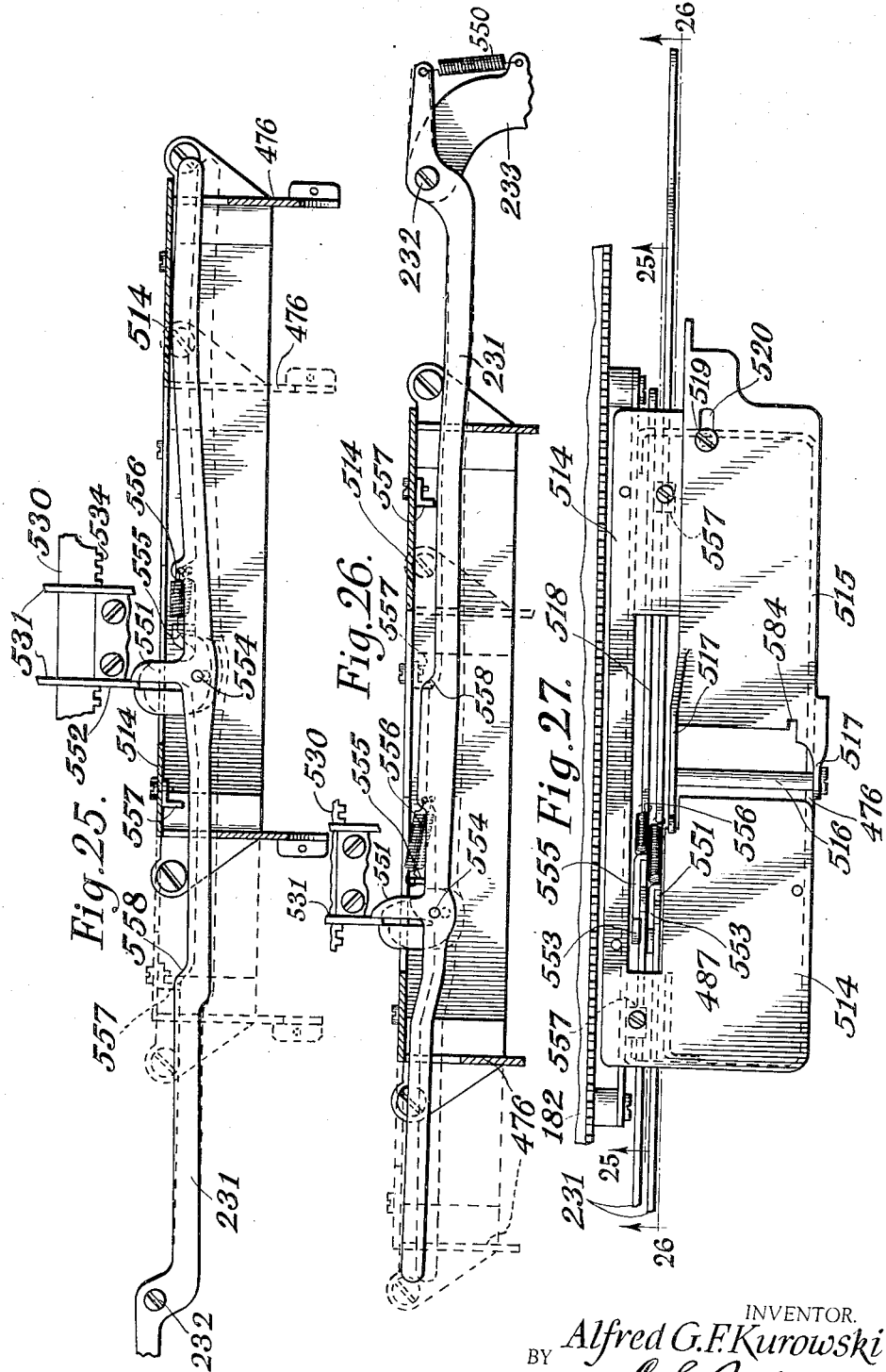

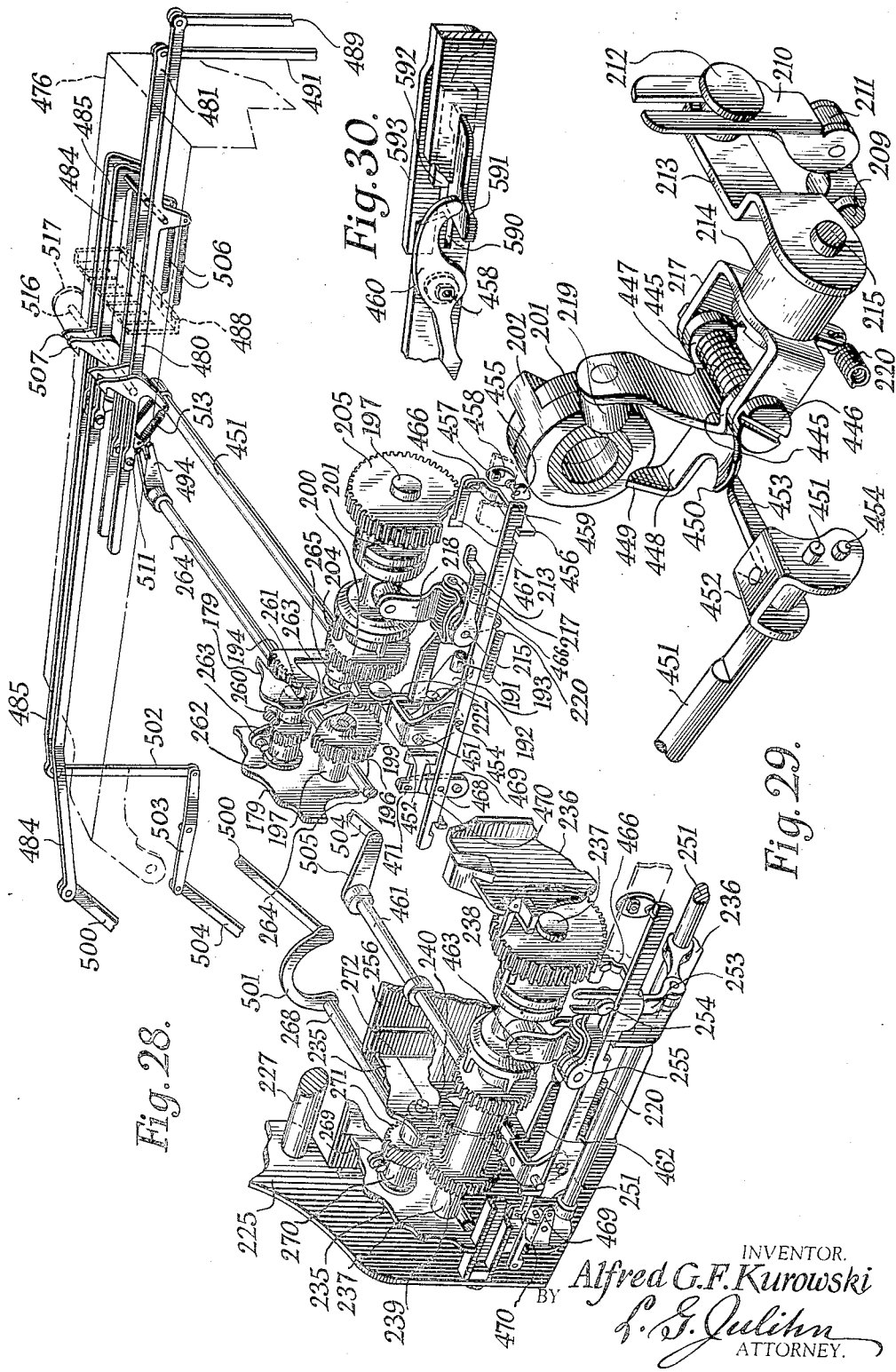

Sept. 10, 1940.                A. G. F. KUROWSKI                2,214,082
                    TYPEWRITING AND CALCULATING MACHINE
                 Original Filed Aug. 31, 1933      13 Sheets-Sheet 12
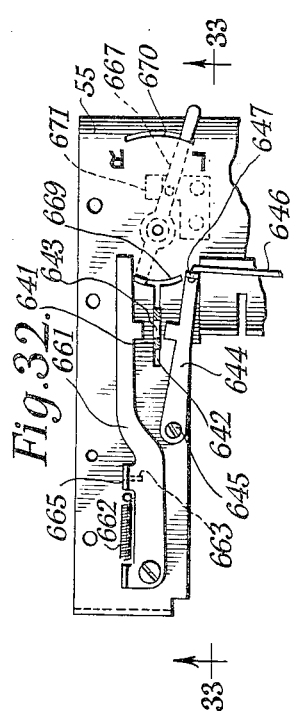
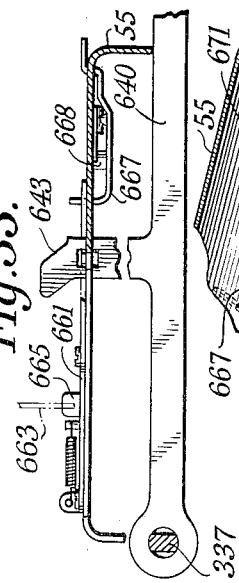
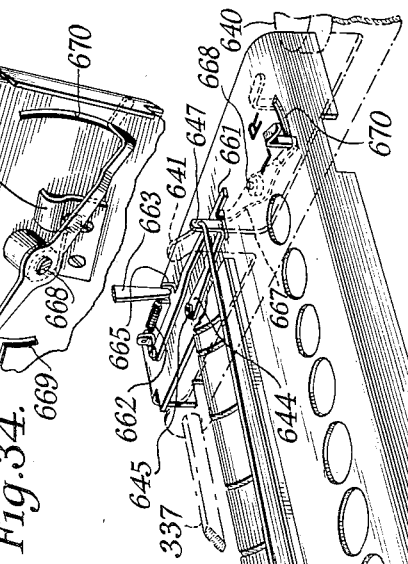
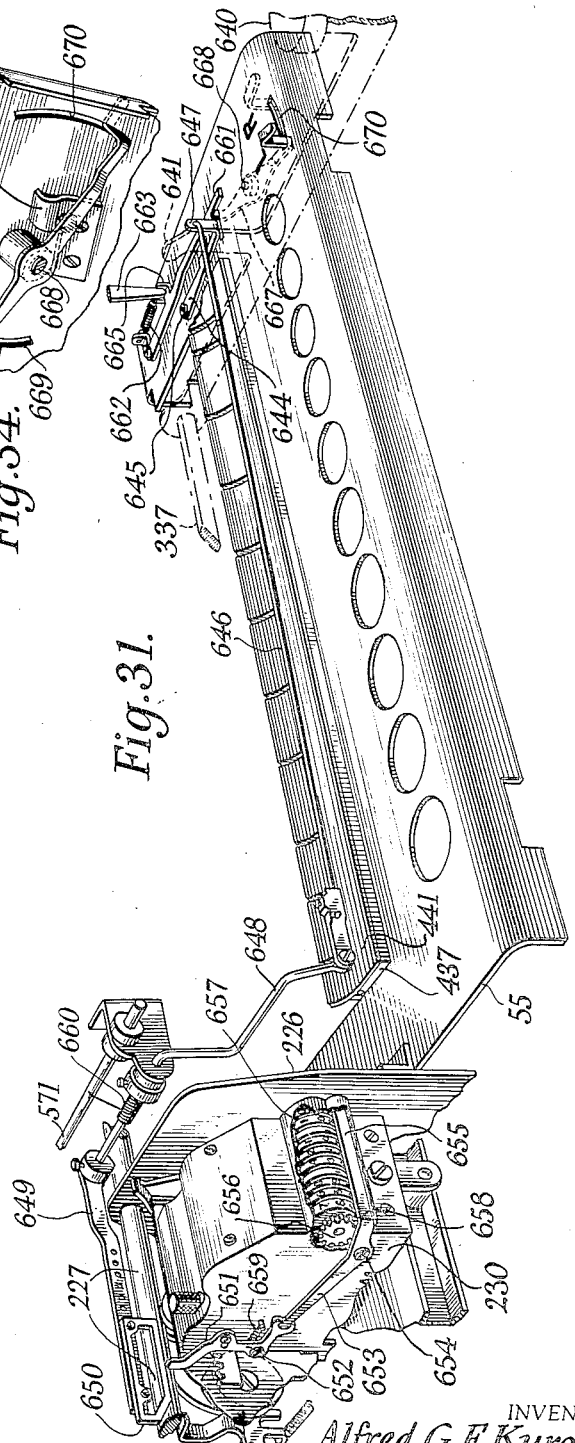
INVENTOR.
Alfred G. F. Kurowski
BY
L. G. Julihn
ATTORNEY Sept. 10, 1940.   A. G. F. KUROWSKI   2,214,082
TYPEWRITING AND CALCULATING MACHINE
Original Filed Aug. 31, 1933   13 Sheets-Sheet 13
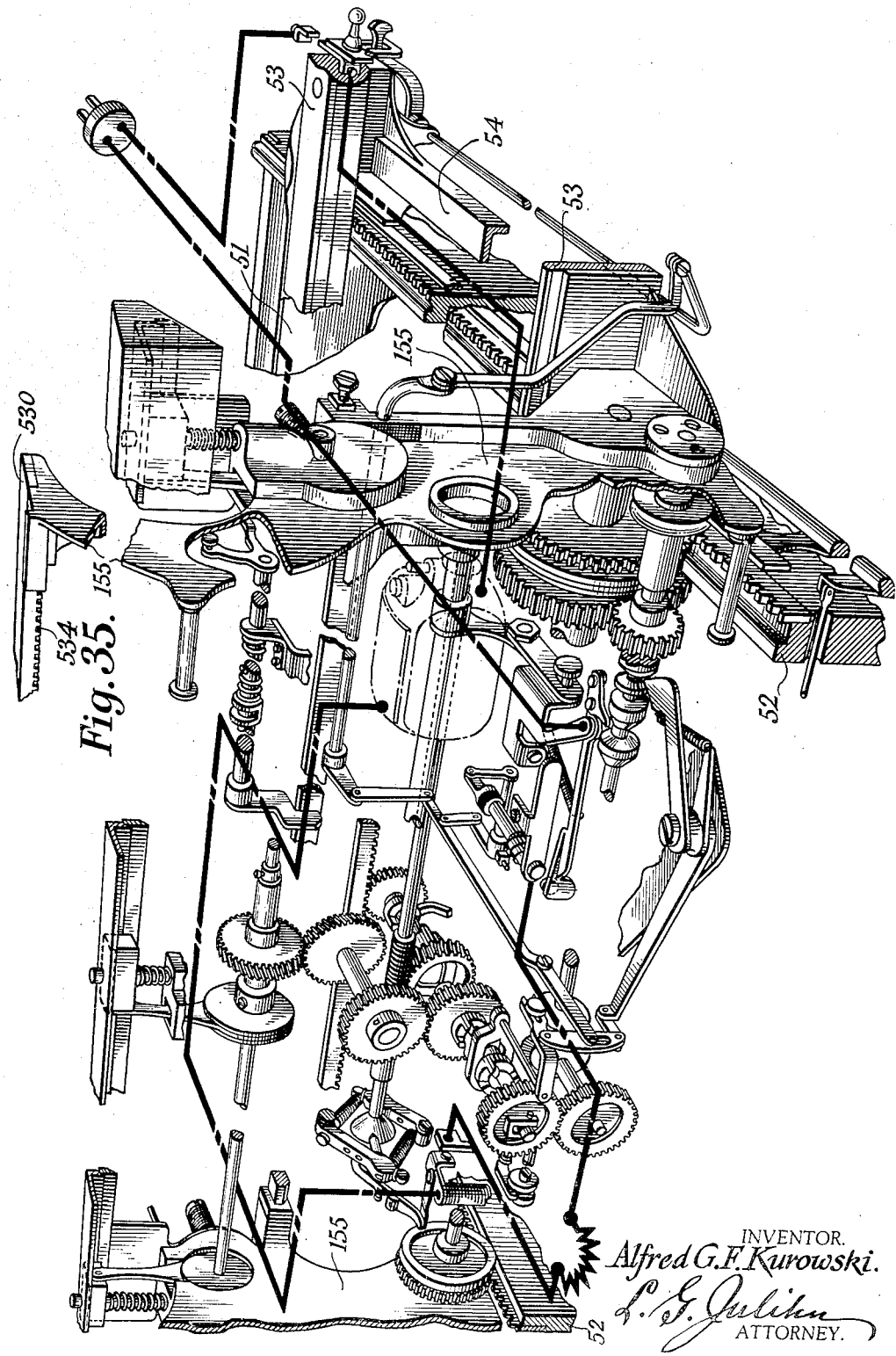
INVENTOR.
Alfred G. F. Kurowski.
ATTORNEY.

Patented Sept. 10, 1940

2,214,082

UNITED STATES PATENT OFFICE 2,214,082

TYPEWRITING AND CALCULATING MACHINE

Alfred G. F. Kurowski, Brooklyn, N. Y., assignor to Underwood Elliott Fisher Company, New York, N. Y., a corporation of Delaware Original application August 31, 1933, Serial No. 687,547. Divided and this application November 21, 1935, Serial No. 50,821

13 Claims. (Cl. 235—59)

The invention relates to calculating machines, and more particularly to combined calculating and typewriting machines, wherein the keys of the typewriting machine control the amount entered in a totalizer, digit by digit, and also control the operation of type bars to print such amount digit by digit.

This case is a division of my co-pending application, filed August 31, 1933, Serial No. 687,547, to which reference is made for a complete disclosure of the entire invention.

Heretofore, calculating mechanisms have been applied to typewriting machines of the front strike type, as the Underwood and the Remington machines.

Also, typewriting machines of the down-strike or book-typewriter style, as the well-known Elliott-Fisher, have been equipped with calculating mechanism differing somewhat in structure and operation from the calculating mechanisms applied to the front strike machines.

One object of the present invention is to render possible the application of a calculating mechanism heretofore individual to machines of the front-strike style, to machines of the down-strike type, or book typewriters, to the end that the same calculating mechanism can be indiscriminately applied to either a front-strike or a down-strike machine, thus enabling the manufacturer to reduce the different kinds of stock parts and assembled calculating mechanisms required to equip typewriting machines of both the styles mentioned.

In attaining this object, it has been necessary to provide certain novel controls for setting the mechanisms to work problems in addition and subtraction, or to render the calculating mechanism idle, as well as to disassociate the calculating mechanism and the keys to enable the machine to be used for typewriting purposes alone.

Furthermore, in the makes of front strike typewriting machines heretofore mentioned, the keyboard and frame parts remain stationary, and the paper carrying platen and its carriage travel step by step in letter spacing direction relatively to a single printing point to which the types are brought upon successive depressions of the keys. Also the platen and paper advance in line spacing direction relatively to the types. In down-strike machines of the Elliott-Fisher type, on the contrary, the key-board with its frame and printing devices travel step by step both transversely and longitudinally relatively to a stationary flat platen, in letter spacing and in line spacing the work, respectively, so that it has been necessary to adapt the controls heretofore mounted on a stationary frame of a front-strike machine, to perform their functions properly when mounted on the traveling keyboard carriage of a down-strike machine of the Elliott-Fisher type.

And the problem is further complicated by the necessity for stationarily mounting the column totalizers of the calculating mechanism of a front strike machine, which column totalizers, in front strike machines, travel with the paper carriage on which they are supported. It is also desirable to arrange that the stationary cross-totalizers of the front strike calculating machine, shall travel with the traveling key carriage of an Elliott-Fisher type machine.

Another object is the provision of a self-contained unitary device or nest of state controls adapted not only to variously determine the state of the respective cross totalizers, that is to say, whether the respective cross totalizers shall add, subtract or remain neutral, but also to determine the states of the column totalizers seriatim as they are engaged with the actuating mechanisms.

In carrying out this feature of the invention, there is provided a set of unitary selectors for association with the respective column totalizers, each selector being equipped with controls arranged according to a predetermined system, to variously influence the state determining mechanisms associated not only with the several cross totalizers, but also with the column totalizer relatively to which at that time the differential mechanism traveling with the key carriage is in effective position.

These selectors are removable and interchangeable on their support relatively to the column totalizers to permit substitution of one for another whenever it is desired to vary the particular set-up to accord with the kind of bookkeeping calculations or entries to be effected on the machine.

Heretofore it has been customary to mount both state-determining cams and decimal spacing cams on the column totalizers, as in U. S. patents to Wahl, 1,270,471, issued June 25, 1918; Wahl 1,349,024, issued August 10, 1920; and Foothorap 1,512,282, October 21, 1924.

These totalizers, because of the precision workmanship required in their manufacture, are quite expensive. Therefore, should one wish to change the prearranged system of state-control, it is necessary to obtain additional totalizers equipped with properly positioned cams to affect the state controls according to the new arrangement.

Of course, it would be possible in Wahl, 1,349,024, above mentioned, to re-adjust the cams to effect the desired change of controls, but such method would require the operator to again re-adjust the cams when the work in process necessitates the use of the original system of controls, for instance.

Provision of a set of self-contained selector units apart from, but operating in association with the column totalizers, which set of units will enable the operator to effect any desired state determination of which the machine is capable, is far less expensive, less complicated, and more easily and quickly handled than heretofore.

Furthermore, the self-contained unitary selectors control the states of all cross totalizers and the particular column totalizer with which the respective selectors are associated.

A further object is to contrive such a unitary selector means which of itself is removable from and adjustably attachable to the machine, independently of the column totalizers, and which, in addition to effecting the above-named controls, will also control decimal spacing, and the selection for operation or elimination of either or both cross and column totalizers.

And in this connection, another object is to enable the proper skipping of decimal spaces when employing a close arrangement of column registers as when calculating amounts printed in and occupying the entire spacing between the column rules.

Heretofore, the column totalizers of Elliott-Fisher machines, as disclosed in U. S. Patent to Bolton, 922,559, issued May 25, 1909, have been equipped with cams so located as to automatically trip the letter-spacing mechanism to form a letter space interval at the proper place in the printed amount for separation of dollars and cens, for instance.

But in close column work where the amounts may extend across the entire column there is a possibility that a digit may be printed on the dividing line or rule between the columns without being registered in its totalizer unless care is taken to avoid such mistake. Also the widths of the side walls of the column totalizers, and the necessary clearance between the wheels of highest and lowest value in a totalizer, and the adjacent side walls to avoid friction, require that the letter space escapement be caused to space twice successively or to jump two spaces, from the units wheel of one column totalizer, so as to position the traveling master wheel of an Elliott-Fisher book typewriter, for example, to register with the wheel of highest value of the succeeding column totalizer.

An object of the present invention is to so arrange the decimal spacing control cams on closely adjacent columnar selectors that the cams will cooperate to automatically effect a double letter spacing movement upon the occurrence of the foregoing conditions, the decimal spacing control cams being so formed as to enable the selectors to be placed in side by side relation with each other when necessary.

Still another object is the provision of novel means to readily enable a change to be made in the state of any of the totalizers, notwithstanding the automatic control of such states by the selectors.

In other words, there is provided simple and effective means to enable the operator to change the state of any totalizer, either column or cross totalizer, in case it becomes necessary to alter the predetermined control thereof imposed by the particular selector at that time in effective position, and without disturbing such predetermined control, thus to enable the reinstatement of such predetermined automatic state control upon the succeeding traverse of the carriage past the column totalizers, after the special operation or entry has been completed.

In obtaining this result, the entire predetermined automatic state control may be temporarily silenced, under control of a single operative element, after which a different set up of states may be separately and manually affected for each totalizer. At the conclusion of such special operation or operations, the manual state control members may be returned to "add" position, the manual neutralizing or non-add controls being likewise returned to their ineffective positions if they have been theretofore adjusted by hand to effective position, whereupon the effectiveness of the automatic state-control is reinstated, and the operator may then proceed with the entry of amounts according to the predetermined automatic system of state controls.

A further object is the provision of means to enable a typewritten entry, including numerals, to be made in a column appropriated for the reception of calculated amounts, by temporarily and simultaneously silencing the automatic state control mechanism, and the decimal spacing control.

As one means to effect this result, there is provided a special key forming part of the regular keyboard and hence, within easy range of the operator's fingers when in the usual positions to depress the keys.

Conveniently, this special key corresponds with the usual case-shift key of the Elliott-Fisher machine which also shifts the ribbon fields.

In the present invention, however, this case shift key performs the additional and novel function of silencing or interrupting the connections between the keys and the differential mechanism for the accumulators, to enable numerals to be printed in the calculating zones without accumulating such numerals.

Heretofore, it has been common in the art to provide the cross totalizers with latching means by which the cross totalizers can be locked in their idle positions, out of operation, by simply imparting a quick advance movement to the cross totalizer by a "flick" of the hand, for instance.

As a result, cross totalizers were often accidentally latched out of operation, unnoticed by a busy operator, who might make several computing operations before the inoperative position of the cross totalizer came to his attention.

Another object, therefore, is to remedy this disadvantage by rendering it necessary for the operator to devote conscious effort to effect the locking of the cross totalizers in their idle positions, and to the release thereof for return to operating position.

Another object is to enable a single clearance proof key to control the clear sign printing of a plurality of cross totalizers.

Heretofore, clearance proof keys controlling the printing of a clear sign in connection with a single cross totalizer have been provided, but the present invention enables a single clearance proof key to be controlled by two or more cross totalizers.

To these and other ends, the invention includes certain novel features and combinations, all of which will be more fully disclosed hereinafter and particularly pointed out in the claims.

Conveniently, the invention is illustrated as applied to a well-known book-typewriter machine, as the Elliott-Fisher machine, it being understood that certain features of the invention are not confined in their application to this type of machine, but may be used on roll platen machines as well, wherein the paper carriage and its platen travel relatively to the keyboard and printing mechanism, instead of the keyboard and printing mechanism traveling relatively to a flat platen.

In the accompanying drawings:

Figure 4 is a fragmentary top plan view of the differential mechanisms for the column totalizers and for the left hand cross totalizer, respectively, and the manually operable state controls therefor;

Figure 5 is a fragmentary view in front elevation, partly in section, showing a column totalizer and the left hand cross totalizer, together with the manual state controls for the respective totalizers, and the manually settable handles for conditioning the numeral keys for manual or power operation; and for disabling and enabling the automatic state controls, respectively;

Figure 6 is a fragmentary top plan view of the grouped state controls forming part of the automatic conditioning means for the column and cross totalizers; also the decimal or skip letter space control;

Figure 7 is a fragmentary rear view, partly in section, of the same grouped mechanisms;

Figure 8 is a detail rear view, illustrating the relation to a selector unit, of one of the state control members and the skip letter spacing member, when disabled by the manually operable means for conditioning the machine for hand or power operation, parts being omitted for clearness;

Figure 9 is a fragmentary left-hand side view, showing a special disabling means for the automatic state control mechanisms, such special disabling means being set by depression of the usual Elliott-Fisher carriage return key, and the Elliott-Fisher case and ribbon shift key, respectively;

Figure 10 is a fragmentary perspective view of the control box in which the grouped automatic state control mechanisms are supported, and a single state control mechanism, together with the manually settable means for disabling the automatic state control of the totalizers, such last-named means being in idle position;

Figure 11 is a similar view, showing the automatic state-control disabling means adjusted to its effective position by the manually operable means for conditioning the machine for hand or power operations;

Figure 12 is a detail perspective view of one of the adjustable and removable selectors through which the automatic state control mechanisms are operated;

Figure 13 is a vertical sectional detail view, showing the relation of a selector to the automatic state control mechanisms, the pick up members connected with the respective cross totalizers, and the decimal or skip letter spacing mechanism;

Figure 1:
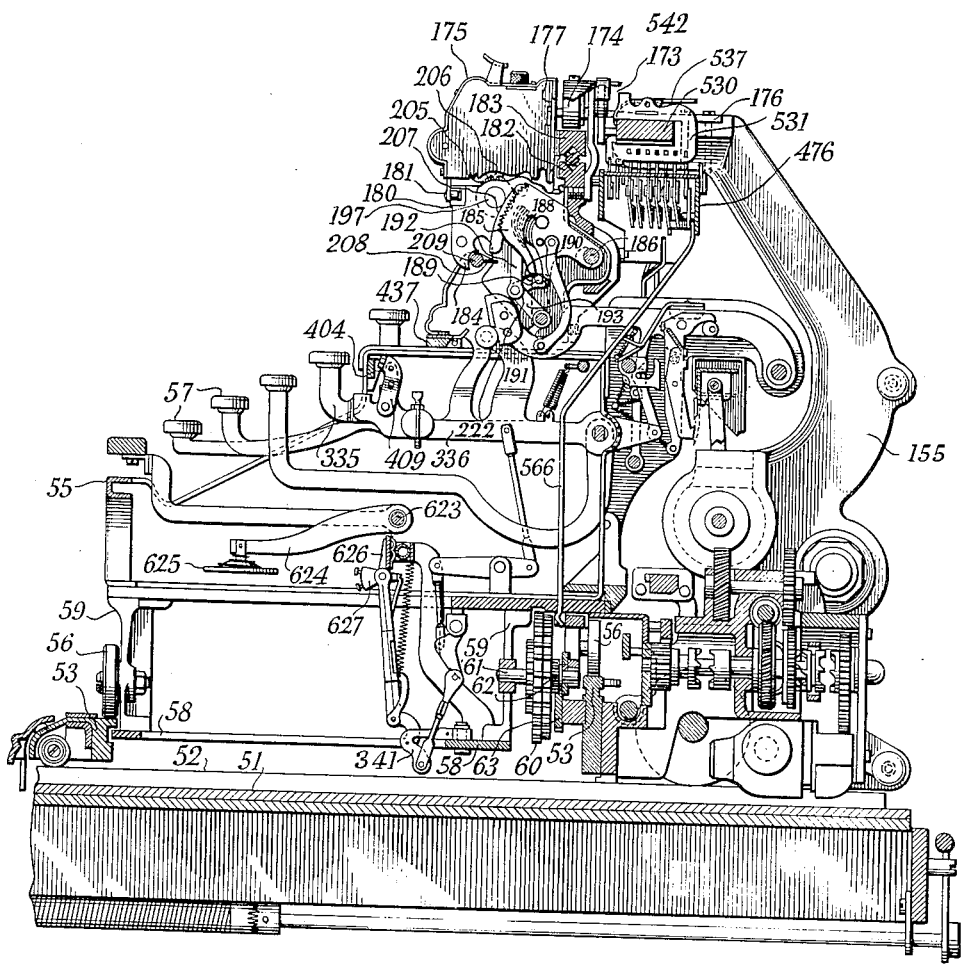
Figure 1 is a vertical sectional view through an Elliott-Fisher book-keeping machine in connection with which the invention is shown, showing a column totalizer, the differential mechanism mounted in the traveling key carriage, and a part of the automatic state control mechanism.

Figures 14 to 19, both inclusive, are detail side views of the several automatic state control members associated with the column totalizers and the respective cross totalizers;

Figure 20 is a fragmentary side view, showing the position assumed by an automatic state control dog under the influence of a selector cam;

Figure 21 is a detail bottom plan view of a fragment of an automatic state-control member and its dog;

Figure 22 is a fragmentary rear view, partly in section, showing a cross totalizer pick-up member engaged with a selector unit, and the decimal skip spacing member also under control of the selector unit;

Figure 23 is a similar view, with the cross totalizer pick-up mechanism omitted, the outermost state control member being shown in its operated position, and the manually operable state control silencing mechanism being in idle position;

Figure 24 is a similar view, showing the manually operable state-control silencing mechanism effective;

Figure 25 is a fragmentary rear view, partly in section, of the right-hand cross totalizer pick-up member engaged with a unit selector, dotted lines showing the disengaged position;

Figure 26 is a similar view of the left-hand cross totalizer pick-up, of different contour from the right-hand pick-up;

Figure 27 is a top plan view of both cross totalizer pick-ups and the control box;

Figure 28 is a fragmentary skeletonized perspective somewhat distorted, showing the relations of the automatic state control mechanisms and the column and cross totalizers, and the clutch and reversing mechanisms for the totalizers;

Figure 29 is a detail perspective of the neutralizing or non-add mechanism;

Figure 30 is a fragmentary detail perspective showing the means for shifting a manually operable state control member and maintaining it where adjusted;

Figure 31 is a fragmentary perspective, showing the single clear sign printing key and the cross-totalizer control thereof;

Figure 32 is an enlarged detail top plan view of the cross totalizer-controlled locking means for the clear sign printing key;

Figure 33 is a fragmentary side view thereof;

Figure 34 is a detail perspective of the means for selecting which of the cross-totalizers shall control the clear sign printing key, locking from beneath and;

Fig. 35 is a skeleton perspective view, somewhat distorted and broken away, illustrating the motor driven trains of gears, for returning the carriage to the beginning of a line, for line spacing the carriage, and for operating the key actuator bar, the motor circuits being shown diagrammatically.

In the operation of round platen writing machines, the paper carriage with its rotary platen, travels from right to left relatively to the stationary supporting frame in which are mounted the keys and printing mechanism.

In the operation of flat platen writing machines, the keyboard and printing mechanism travel from left to right and also from rear to front relatively to a flat bed supporting the work sheet.

In the illustrated embodiment of this invention, the accumulating assembly of column and cross totalizers modified and controlled in novel manner, is applied to the well-known Elliott-Fisher typewriting machine disclosed generally, in U. S. Patents to Parmly, 1,143,223, issued June 15, 1915; and to Foothorap, 1,203,519, issued October 31, 1916; 1,251,361, December 25, 1917; 1,275,413, issued August 13, 1918; 1,283,489, issued November 5, 1918; 1,459,200, issued June 19, 1923; 1,512,282, issued October 21, 1924, 1,538,382, issued May 19, 1925, and 1,904,127, issued April 18, 1933.

The Elliott-Fisher machine includes a suitably-supported flat platen or bed 51 (Fig. 1), on which the work sheets lie in horizontal position. Tracks 52, located alongside the opposite side edges of the flat platen and extending from rear to front thereof, support a traveling line spacing frame extending transversely of the platen, and including spaced front and rear rails 53, 53, (Fig. 2) connected near their opposite ends by spreader bars 54, 54, (Fig. 35).

A key carriage 55, (Fig. 1), the frame of which is equipped with pairs of front and rear wheels 56, is mounted on and travels along the front and rear rails 53, 53 of the line-spacing frame, in letter-spacing direction (left to right) and return.

The usual keys 57 representing the letters of the alphabet are suitably pivoted in the key carriage frame and connected by separate linkages with their respective down-strike type bars pivoted in hangers secured to a horizontally arranged type bar sector 58 suspended just above the platen 51 by posts 59, from the main frame of the key carriage.

Depression of the letter keys operates their respective linkages to swing downwardly the corresponding type bars with their types, whereby to effect the imprint of the desired characters upon the work sheet, through the usual ribbon, not shown.

Depression of the letter keys also trips the usual letter space escapement dogs (not shown) cooperating with a ratchet wheel 60 fast on a short escapement shaft 61, suitably journaled in the key carriage structure to travel therewith. A carriage feed pinion 62 turning with the escapement ratchet 60, meshes with the customary letter spacing feed rack 63 supported by the rear rail 53 of the line-spacing frame, to enable the feed motor, not shown, but usually in the form of a spring drum supported on the line space frame, to advance the key carriage in letter spacing direction upon the release of the key, all as more fully shown and described in U. S. Patent to Foothorap, 1,203,519, issued October 31, 1916, to which reference may be made for a more complete exposition of this mechanism.

The key carriage 55 is provided with the usual carriage return key 70, (Fig. 9) disclosed in Foothorap, 1,904,127 heretofore mentioned, and with a case shift key 71, shown in Foothorap, U. S. Patent No. 1,459,200. Reference to these key mechanisms in greater detail will be made hereinafter.

Column totalizer mechanism

Figure 3:
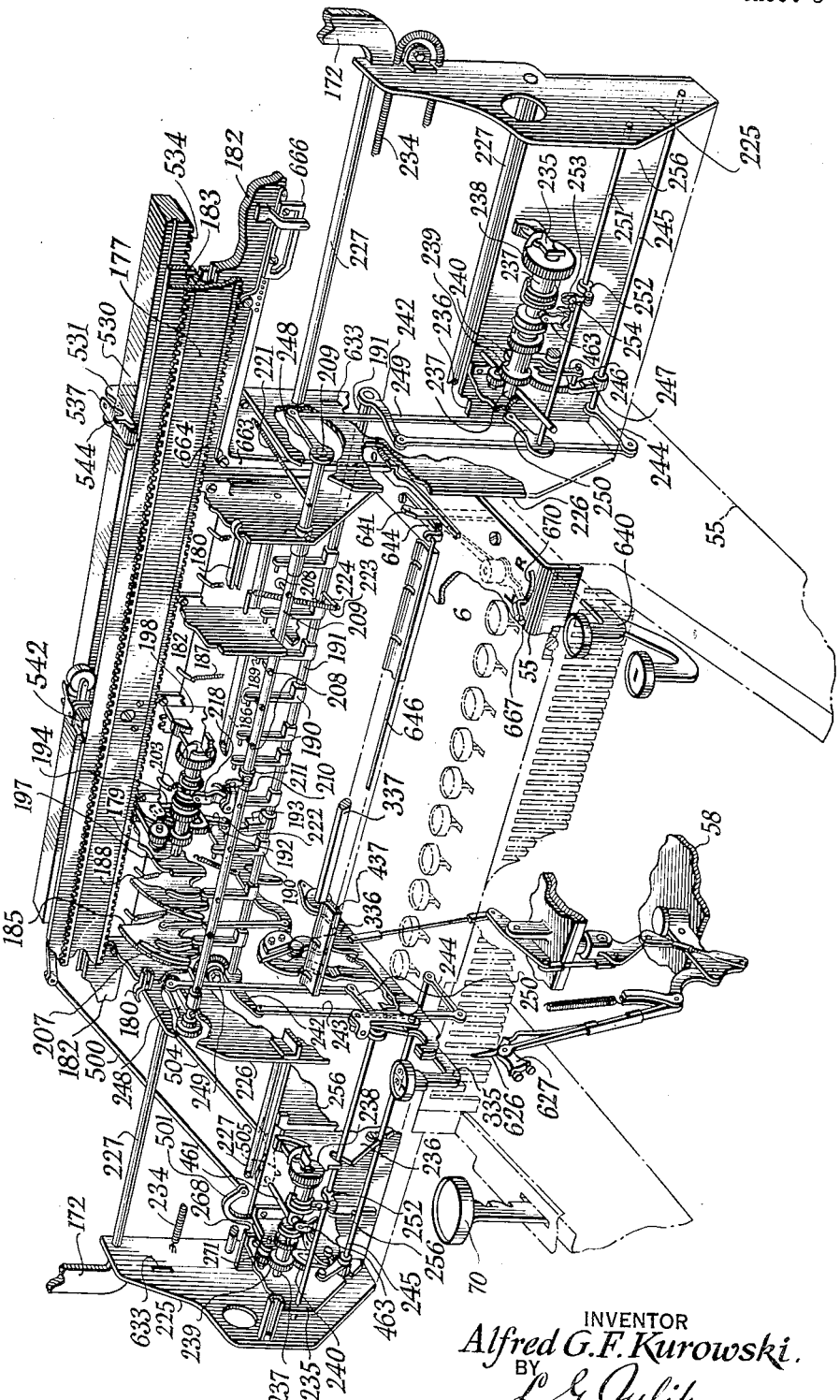
Figure 3 is a fragmentary skeleton perspective showing principally a type-action associated with the differential mechanisms for the column and cross totalizers.

In the machine embodying the present invention, the side frames of the traveling key carriage 55 at their upper rear ends, support a transversely extending webbed rail 182, the central depending portion of which web fits between the side frames of the key carriage, as shown in Figs. 3 and 7, and is formed with a longitudinally extending rearwardly bulging channel (see Fig. 1).

A race extending along the upper edge of the traveling rail 182 accommodates anti-friction rolls (Figs. 1 and 9) which support a stationary rail 183 loosely and adjustably connected to the forwardly projecting ends of hangers 176, the rear ends of which hangers are fastened to the upper forwardly extended ends of the upright brackets 155 of the line spacing frame.

A column totalizer supporting bar 177 is fastened to the front face of the stationary rail 183 and extends transversely of the machine above the hood 178 (Fig. 5) of the traveling key carriage.

Column totalizers 175 of any suitable type, as that shown in U. S. patents to Wahl, 1,148,733, issued August 3, 1915, and to Kurowski 1,835,165, issued December 8, 1931, and 1,876,696, issued September 13, 1932, are releasably and adjustably secured to the bar 177, in any desired letter space relation.

The column totalizers project over the hood 178 (Figs. 1, 5 and 9) of the traveling key carriage, a channel bar 180 being fastened across the face of the hood to accommodate guide rollers 181 suitably supported by and depending from the forward lower ends of the respective column totalizers.

A strap 173 (Fig. 1) fastened at its lower end to the rear face of the lower traveling rail 182, extends upwardly to a point above the upper stationary rail 183 where it carries a roll 174 traveling along the upper edge of the rail 183 to constitute a traveling tie between the rails.

Side frame plates 184, (Figs. 1 and 3), are arranged in vertical planes within the hood 178 forming the upper part of the traveling key carriage, and are secured by flanges at their rear edges to the forward face of the traveling rail 182. These side frame plates support the differential driving means for the master wheel coacting with the column totalizers, which means closely approximates that shown in U. S. patent to Kurowski, 1,835,165.

Such differential mechanism is operated by a notational series of cam-slotted sectors 185 from "1" to "9," (Figs. 1, 3 and 4), journaled for independent rocking movement on a supporting rod 186 mounted at its opposite ends in the side frames 184 of the traveling key carriage, the longitudinal bulge in the web of the traveling rail 182 being formed to clear the fulcrum rod 186, and being slitted to afford guides for the sectors.

Springs 187, (Fig. 3), yieldingly retain the sectors in their normal raised positions against the front face of the rail 182 as a back stop.

The notational sectors 185 each rock through arcs of like extents, but are severally provided with the differential cam slots 188 adapted to embrace studs 189 projecting laterally from upright arms 190 fast on a differential shaft 191 journaled at its ends in the side frames 184 through which the ends of the shaft project.

The sector 185 corresponding to the digit "9," when rocked downwardly through its arc of travel, fits its cam slot 188 over the corresponding stud 189 to rock its corresponding arm 190 and the differential shaft 191 nine steps or increments, due to the angle of its cam slot, whereas the sector corresponding to the digit "1" will rock the differential shaft 191 through a single step only.

A link 192 (Figs. 1 and 3), the lower end of which is loosely pivoted by a long stud 222 (Fig. 28) to an arm 193 on the differential shaft 191, connects at its upper end with a toothed segment 194 pivoted on and slidable axially of a short rod 195 (Fig. 4) mounted at its ends in sub-frames 179, secured at their rear edges to the face of the rail 182, (Figs. 3 and 4), and between the end plates 184 of the hood frame.

The segment 194 is adapted to mesh with an intermediate gear 196 (Figs. 4 and 28) rotatably mounted near one end of a shaft 197 journaled in and extending between one of the sub-frames 79 and the sub-frame 198, (Figs. 3 and 4), located parallel with and between the hood side frames 184, to transmit the differential rotation of the shaft 191 to the intermediate gear 196.

A sleeve 199 (Fig. 4) journaled on the shaft 197 connects the intermediate gear 196 with a clutch member 200 (Figs. 4 and 28) in the form of a toothed wheel, opposed to which is a clutch disk 201 which may be fast on the shaft 197 and which is slotted to slidingly accommodate a finger 202 projecting from a grooved collar 203 slidable on the shaft 197 between the clutch member 200 and the clutch disk 201. Fingers 204 projecting from the collar oppositely to the finger 202, are adapted to enter between adjacent teeth of the toothed clutch member 200, to communicate the differential rotation of the intermediate gear 196 to the clutch disk 201 and to a master gear wheel 205 which may also be fast on the shaft 197.

Thus, as the key carriage travels in letter spacing direction from left to right across the platen, the master gear wheel 205 meshes successively with the denominational gear wheels 206 (Fig. 9) of the particular column totalizer at that time in position to be operated, to register amounts thereon.

Normally, the sliding collar 203 remains at its right hand limit of travel, with its fingers 204 withdrawn from engagement with the toothed clutch member 200. To automatically complete the clutch connection between the intermediate gear 196 and the master gear wheel 205, each notational slotted sector 185 carries a cam shoe 207 (Figs. 1, 3 and 4) adapted to contact with its corresponding pin 208 of a series of such pins projecting from a clutch control shaft 209 extending parallel with the differential shaft 191 and journaled in the hood side frames 184 through which the ends of the clutch control shaft project.

A forked link 210 (best shown in Fig. 29) pivoted to the outer end of an arm 211 fast on the clutch control shaft 209, embraces a headed stud 212 projecting from one arm of a lever 213, connected to the outer end of a sleeve 214 journaled on a stud 215 projecting rearwardly from a reinforcing bar fast on the front plate 216 (Fig. 4) of the hood.

A yoke 217 (Fig. 29) fast on the inner end of the sleeve 214, supports a clutch-shifting arm 218 carrying a roller 219 entered in the groove of the clutch collar 203, (Fig. 28), and a spring 220 connected to an eye on the yoke, tends to yieldingly retain the clutch shifting arm 218 at the clockwise end of its throw and the clutch collar 203 disengaged from the clutch member 200.

The shoes 207 project in advance of their cam-slotted notation sectors 185 so as to operate the clutch control shaft 209 to establish the clutch connection prior to the actuation of the differential shaft 191 by the walls of the cam slots 188, the shoes being of such length as to escape their pins 208 as the cam-slotted sectors 185 complete their down strokes, whereupon a spring 221 (Fig. 3), connected to the clutch-control shaft 209, rocks the clutch control shaft back to normal, and enables the spring 220 to restore the clutch collar 203 and lever 218 with its thereto connected arm 213 to their normal positions to disengage the clutch connection prior to the return of the depressed cam-slotted sector 185.

Therefore, although the depressed sectors 185, on their return to normal under the influence of their springs 187, rock the differential shaft 191 reversely, this reverse rotation is not transmitted to the master wheel 205. A spring 223 connected to an arm 224 projecting from the differential shaft 191, insures the return of the latter with its arms 190, to normal.

As shown, for instance, in U. S. patent to Wahl, 1,270,471, issued June 25, 1918, the cross totalizers which, in the Elliott-Fisher machine, are mounted on the opposite ends of the traveling key carriage, are controlled as to the amounts registered therein, by the main differential mechanism.

In the present instance, supplemental frames, (Figs. 2–5 and 28), project from the opposite sides of the traveling key carriage 55.

These auxiliary frames each include spaced inner and outer side walls 225, 226, the inner walls being secured to the sides of the hood 178 of the traveling key carriage 55. Pairs of horizontal, parallel guide rods 227 arranged in vertical relation connect the outer walls 225 to the inner walls 226, and hangers 172 depending from opposite ends of the overhead traveling rail 182 connect with the outer walls 225 to afford additional support and rigidity.

The guide rods 227 form ways for the wheeled cross-totalizer trucks 228 (Figs. 2 and 5) adapted for limited travel thereon.

Right and left cross totalizers 230, the left one only being shown, are detachably and adjustably secured to the wheeled trucks 228 to travel therewith, and are so arranged that normally, entry of an amount digit by digit into the column totalizers will be accompanied by entry of the same amount simultaneously in both cross totalizers.

In attaining this result, the respective cross totalizer trucks 228 are each equipped with a pick-up link 231 (Fig. 2) pivoted at 232 to a bracket 233 fast on its respective truck 228 and adapted to coact with means, hereinafter explained, to arrest the travel of the trucks and cross totalizers while the key carriage is traveling through a computing zone. Springs 234 restore the cross totalizers to their right hand limits of travel upon the release of the pick-up links as the key carriage passes out of each computing zone.

A master wheel shaft 237 is journaled in a sub-frame 235, 236 (Figs. 4, 9 and 28), fastened within each cross totalizer supporting frame to a back plate 256 extending between and connecting the lower ends of the side walls 225 and 226. The shafts 237 are each equipped with a master wheel 238, a clutch mechanism, and an intermediate transmission gear 239, which are like the similar mechanisms heretofore described in connection with the column totalizers, and need not be again explained.

Differential segments 240, like the differential segment 195 of the differential mechanism for the column totalizers, are pivoted on short rods 241 in the respective sub-frames 235, 236 for engagement with the cross totalizer intermediate gears 239, and are adapted to slide laterally along their pivotal supports.

For the purpose of transmitting the differential movement of the differential shaft 191 of the column totalizers to the differential segments 240 of the cross totalizers, the main differential shaft 191, at its opposite ends which protrude beyond the side walls of the key carriage, carries arms 242 (Figs. 3, 4 and 5) connected by links 243 with similar arms 244 fast on auxiliary differential shafts 245 journaled in the respective cross totalizer main frames 225, 226.

Shorter links 246 (see also Fig. 9) connect cranks 247 on the cross totalizer differential shafts 245 with their respective differential segments 240.

The lower ends of these links 246 are slidable along studs 257 projecting from the cranks 247, to accompany the differential segments 240 when the latter are slid axially.

Similarly, to control the transmission clutch mechanisms for the cross totalizer master wheels 238 simultaneously with the coupling and uncoupling of the transmission clutch 200, 203 for the column totalizer master wheel, the protruding ends of the main clutch control shaft 209 carry arms 248 connected by links 249 with corresponding arms 250 fast on auxiliary clutch control shafts 251 journaled in the respective cross totalizer main frames.

Arms 252 (Figs. 3 and 28) secured to the respective auxiliary clutch control shafts 251 pivotally support slotted links 253, adapted to embrace the headed studs 254 of the auxiliary clutch control arms 255 identical with the clutch control arm 213 (Fig. 29), the several clutch mechanisms for the transmission of differential movement to the respective master wheels of the column and cross totalizers being constructed alike and normally synchronously operable.

As shown in U. S. patent to Kurowski, 1,835,165 heretofore referred to, subtraction is effected on the column totalizers by providing the differential transmission mechanism with a wide reversing pinion 260 (Figs. 4 and 28) slidably mounted on a supporting stud 261 extending between and fastened in the sub-frames 179, adjacent the intermediate transmission gear 196 and the differential segment 194.

A grooved hub 262 fast with the wide reversing pinion 260, accommodates a pin on the upper arm of a lever 263 secured to an add-subtract shaft 264, the lower arm of which lever likewise carries a pin entered in a groove formed in the hub 265 of the differential segment 194, which segment and hub may be slid laterally on its rod 195, the link 192 likewise sliding with the segment, on its long pivot pin 222.

The add-subtract shaft 264 passes from front to rear through the hood in which it is suitably journaled, the forward end of the shaft carrying an index finger 266, (Figs. 4 and 5), adapted to rock with the shaft.

A spring 267 (Fig. 4) normally aids in restoring the add-subtract shaft to, and yieldingly retaining it at its counter-clockwise limit of rotation, wherein the upper arm of the lever 263 (Fig. 28), holds the broad reversing pinion 260 out of mesh with the intermediate transmission gear 196, the lower arm of the lever maintaining the differential segment 194 in mesh with such intermediate pinion.

Rocking the add-subtract shaft 264 clockwise causes the lever 263 to shift the reversing pinion to the right along its pivot 261 into mesh with the intermediate gear 196 and simultaneously shifts the differential segment 194 to the left along its rod 195 to disengage it from the intermediate gear and mesh it with the wide reversing pinion, whereupon amounts set up in the machine may be subtracted digit by digit from the amount registered on the column totalizer.

Similar state controlling shafts 268 (Figs. 4, 5, 9 and 28) journaled in the respective right and left cross totalizer frames and extending from front to rear thereof, carry shift levers 269, the upper ends of which engage the grooved collars 270 of reversing gears 271 slidably journaled on sub shafts 272 supported in the sub-frames 235 of the main cross totalizer frames.

The lower ends of the shift levers 269 engage the grooved hubs 273 (Fig. 9) of the cross totalizer differential segments 240 fulcrumed on the rods 241.

Clockwise oscillation of the state-control shafts 268 rocks their respective levers 269 to shift the broad reversing gears 271 from their normally idle positions at the left of the cross totalizer transmission pinions 239, into mesh with such pinions and simultaneously disengages the cross totalizer differential segments 240 from the transmission pinions 239 and shifts them into mesh with the wide reversing gears 271, to condition the differential mechanism for direct subtraction.

Pointers 274 on the forward ends of the state control shafts 268 indicate the condition, as "Add" or "Subtract."

The foregoing features are broadly old, as shown in the prior art referred to in connection with the description, and constitute a part of the present invention only insofar as they combine with the novel features hereinafter disclosed, to attain the desired results.

*Connecting and disconnecting complementary key levers*

Each of the numeral key levers, (Figs. 1, 3, 4 and 5), is formed of a pair of companion or complementary levers 335 and 336 which are capable of connection for simultaneous operation manually, as when it is desired to use the machine for writing only, and for disconnection, to enable the manual operation of one of the levers to set mechanism through which the remaining or printing lever, and the calculating mechanism are power driven, all as more fully set forth in my co-pending application, Serial No. 687,547.

Manually operable means is provided to shift the latches 409 and otherwise condition the machine as a simple non-calculating writing machine, or as a combined writing-calculating machine as desired.

Referring more particularly to Figs. 3, 4, 5, 9 and 11, a manually operable handle 400 is fast on the front end of a rearwardly extending shaft 401 suitably journaled in the front and rear walls of the head 178 of the key carriage; such shaft having also fast thereon near its forward end, a crank 402 in the nature of a ball-crank, the free end of which seats in a recess 403 formed at one end of a control slide or member 404 extending across the machine just above the forward ends of the pairs of complementary levers 335, 336 constituting the bank of numeral keys. The slide lies just behind the set back front wall of the upper part of the key carriage 55, (Fig. 1), headed studs 405, (Fig. 5), projecting forwardly from the slide and traversing slides 406ᵃ in the front wall of the frame of the key carriage to support and guide the slide in its operation.

Pairs of wings 406 project rearwardly in spaced relation from the rear face of the slide 404 to embrace bosses 407 extending forwardly from laterally turned lips 408 formed on the upper free ends of latches 409 loosely secured by fastenings 410 at their lower ends to their respective printing levers 336 for lateral movement. These latches 409 on the printing levers 336 releasably coact with standards mounted on the setting levers 335 complementary to the printing levers to connect the complementary levers for simultaneous actuation, or to disconnect the complementary levers to enable relative movement thereof, all as more fully shown and described in my co-pending application Serial No. 687,547.

Assuming the keyboard to be conditioned for hand operation only, in which the pairs of complementary levers 335, 336 forming the several numeral keys, are connected by their individual latch mechanisms 409, it is obvious that the handle 400 and crank 402, when rocked counterclockwise, to the position shown in Fig. 5, to condition the calculating mechanism for power operation, will shift the slide 404 to the right, the wings 406 of the slide swaying the latches 409 in like direction to disengage them from their respective keepers 414, thereby enabling independent operation of the complementary setting and printing levers when the machine is to be used for both writing and calculating.

Shifting the handle 400 with its shaft 401 and arm 417, clockwise from the position shown in Fig. 5 shifts the key-control slide 404 to the left, the wings 406 restoring the latches to fit their apertures over the keepers 414 to connect the respective complementary levers for use in the ordinary manner when writing numerals without calculating, the slide also shifting the key-arresting stops 416 out of the paths of the left-hand extensions of the studs 414 to enable the operator to impart a down stroke of the usual extent to the key levers 335 which, through their latch connections with the complementary printing levers 336, rock the latter downwardly to print the selected numerals.

The arm 417 wipes along a cam 418 fast on a bail shown in Fig. 1, but not numbered, to disconnect the keys and the differential mechanism for the actuator, all as shown and explained in my co-pending parent application, Serial No. 687,547, now Patent No. 2,099,565, issued November 16, 1937.

*Neutralizing state control of the column and cross totalizers*

The amounts represented by depression of the numeral keys 335 are entered digit by digit, either additively or subtractively, and in any desired combination, on the column and cross totalizers.

Heretofore, reference has been made to the respective column totalizers 175 (Figs. 1, 2, 5 and 9), mounted in alinement on their transversely extending supporting bar 177, suspended from the upper ends of the brackets 155 and relatively to which the key carriage, with its cross totalizers, travels, the key carriage containing the main and auxiliary differential mechanisms including master wheels, for actuating the totalizer wheels of the successive column totalizers, and the cross totalizers, respectively.

Comparison with the former Elliott-Fisher type of machines shows that in such machines, the cross totalizers are fixedly mounted with respect to the key carriage with which they travel, traveling master wheels being provided for each cross totalizer.

Normally, these cross totalizer master wheels travel synchronously with, and are stationary relatively to their respective cross totalizers, but as the traveling key carriage enters the computing zones of the successive fixed column totalizers, pick-up mechanism connected with the respective cross totalizer master wheels interrupts the synchronous travel of the latter with the key carriage, and causes such master wheels to advance from the totalizer wheels of highest to lowest order of their respective cross totalizers simultaneously with the step by step advance of the key carriage in its passage from highest to lowest order through the successive computing zones of the series of column totalizers.

In the present invention, the cross totalizers travel with the key carriage, but instead of being fixed relatively thereto, they are adapted for movement relatively to the key carriage and their respective master wheels.

The direction of rotation of all the master wheels to effect addition or subtraction on the respective column and cross totalizers may be manually determined by manipulation of the reversing gear control shafts 264 for the column totalizer master wheel, and 266 for the respective cross totalizer master wheels.

Novel means is also provided to silence or "neutralize" the master wheels when desired, to non-add, that is, to render the calculating mechanism unresponsive to the action of the differential mechanism, such means also constituting a state control.

Referring particularly to the "neutralizing" feature of the present invention, it will be recalled that a clutch mechanism 200, 201, 202, 203, 204 (Fig. 28) is interposed between the intermediate differential gear 196 and the master wheel 205 for the column totalizers, and that this clutch mechanism is rendered active and idle by shifting the grooved clutch collar 203 through a shifter 218 carried by a rotatable yoke 217 (see also Fig. 29) rocked in one direction by a train of spring-restored mechanism actuated by the shoes 207 of the key-controlled differential sectors 185.

To prevent entry of amounts into any of the column totalizers either additively or subtractively, and hence "neutralize" such totalizers, the master wheel clutch shifter 218 is made disengageable relatively to the clutch collar 203, by pivotally mounting it on the rotatable yoke 217. To this end, the clutch shifting arm 218, is formed with ears 445 (Fig. 29) journaled on a stud 446 mounted in and extending between the arms of the yoke 217, a spring 447 on the stud tending to rock the clutch shifting arm 218 into the groove in the clutch collar.

At a point just below the ears 445, the clutch shifter 218 carries a rearwardly extending trip projection 448 terminating at its free end in an upturned stop lug 449, the projection also having a lateral toe 450.

A neutralizer shaft 451 suitably journaled in the front and rear walls of the hood 178 of the key carriage, carries near its forward end a clip 452 fast thereon, one end of which is laterally extended to form a trip finger 453, the free end of which lies beneath the trip toe 450.

The remaining arm of the clip is extended downwardly for pivotal attachment at 454 intermediate the ends of a horizontal link 455 supported for endwise movement on shoulders 456 (Fig. 28) formed on the sub-frame plates 179, 198.

A crank 457, the hub 458 of which is journaled in the front wall of the hood 178, carries a crank pin 459 seated in a recess formed in the right hand end of the link 455. The outer end of the hub 458 is slabbed and protrudes through the front wall of the hood, to support a combined finger piece and indicator 460 (Fig. 30) fixed thereto.

The operator, by manually rotating the finger piece counter-clockwise, rocks the crank 457 and shifts the link 455 to the right to rock the clip 452 and neutralizer shaft 451 in like direction.

The trip finger 453 of the clip will thereupon impinge the trip toe 450, rocking the projection 448 upwardly and the clutch shifter arm 218 forwardly against the tension of the spring 447, to disengage the clutch shifter arm from its clutch collar 203.

The upturned stop lug 449 works up and down in the groove of the clutch collar 203, upon relative movement of the clutch shifter arm 218 and its clutch collar, and under compulsion of the spring 220, is held in contact with the right hand wall of the groove, to prevent lateral movement of the clutch shifter arm out of line with the groove in its clutch collar under influence of the same spring 220, when the clutch shifter arm is disengaged from its collar.

Obviously, this interruption in the train of mechanism from the differential intermediate gear 193 to the master wheel 205 prevents transmission of movement of the master wheel and hence the column totalizers are not actuated.

Reversely rotating the finger piece 460 thrusts link 455 leftward and rocks the clip 452 and the neutralizer shaft 451 to swing the trip finger 453 clockwise (Figs. 28, 29) releasing the clutch shifter arm 218 to the action of its spring 447 which snaps the shifter arm backwardly into its groove in the clutch collar 203, and causes the ear 449 of the rearward projection 448 to follow the trip finger 453 downwardly.

Similar neutralizing mechanism, as shown in Fig. 28, is provided for the respective cross totalizers to interrupt the transmission of differential rotation to their respective master wheels 238, the neutralizing shafts 461 of the respective clutch mechanisms for the cross totalizers being journaled in the front and rear walls of the cross totalizer housings, and equipped near their forward ends with trip fingers 462 to control the respective clutch shifter arms 463.

Also combined finger pieces and indicators 464 (Fig. 5) are similarly linked, as at 465, to their respective cross totalizer neutralizing shafts 461, to afford manual control of the clutch mechanisms.

Brackets 466 (Fig. 28) fast with each link 455, 465 project rearwardly to a point adjacent the respective master wheels 205, 238 for the column and cross totalizers, respectively, the free ends of such brackets carrying detents 467, which lie apart from the master wheels when the totalizers are conditioned for either addition or subtraction, but upon a neutralizing operation, the links 455, 465 when shifted to the right, draw with them the brackets 466 and engage the detents 467 with their master wheels to lock the latter against accidental movement so long as the totalizers remain neutralized.

The act of re-establishing the connections between the clutch shifting arms 218, 463 and their clutch collars coincidently disengages the detents from their master wheels.

It will be understood that the separate neutralizing mechanisms for the column totalizers and for the respective cross totalizers are independently operable to effect any of a variety of combinations.

Also that the Add-Subtract controls are likewise separately settable to effect a like variety of combinations, the two classes of controls together affording a wide choice of systems.

*State indication*

Each of the combined finger pieces and indicators 266 and 274, provided for the manual control of the add-subtract state of the column and cross totalizers, respectively, as heretofore explained, co-act with suitable indicia as "A" (Add) and "S" (Subtract) borne by the front walls of the hood 178 and of the cross totalizer housings to indicate the condition of the adjustment.

Likewise the neutralizer finger pieces and indicators 460, 464 for the column and cross totalizers, respectively, co-act with a single index character, as "N" (Neutral) on the front walls of the hood and of the cross totalizer housings, respectively, to indicate the operativeness of the respective master wheels 205, 238 and hence, of the totalizers.

Obviously, the indications associated with the "Add-Subtract" pointers 266 and 274 which designate the state of the totalizers should be concealed when the neutralizing pointer 460 or 464 co-related with the corresponding totalizer is in its neutralizing position, to prevent a false or misleading indication, the indications being exposed when the neutralizing mechanism is in its idle position.

Referring to the state control mechanism for the column totalizers, this result is conveniently effected by pivotally attaching the shiftable link 455 (Fig. 28), as at 468, to a suitably supported swinging arm 469.

A suitable blind 470 has a pin and slot connection 471 with the upper end of the supporting arm 469, the opposite end of the blind being extended at right angles forwardly through a slot in the front wall on which it rides, and then downwardly to form a concealing shutter, which normally is positioned by the neutralizing link 455 at one side of the indicia "A" and "S", associated with the Add-Subtract pointer 266, as shown in Fig. 5, on the left hand cross footer housing.

In the operation of the neutralizing shaft 451 to displace the clutch shifting arm 218, the link 455 shifts to the right (Fig. 28) drawing with it the blind 470 to cover the indicia "A" and "S", as shown in connection with the column register control, the neutralizer pointer 460 at the same time, moving from its blank indicating position to the "N" position.

The parts resume their normal positions upon the return of the neutralizing mechanism to idle position.

Identical mechanism are employed in connection with the right and left cross totalizer state indicators, as indicated in Fig. 28, for the left cross totalizer by the use of the reference characters 469 and 470, it being readily apparent that the foregoing explanation applies as well to the cross totalizer state indications.

Automatic state controls

Automatic determination of the states of the respective cross totalizers according to a predetermined plan, broadly speaking, is shown in U. S. patents to Foothorap, 1,538,392, and to Wahl, 1,270,471; 1,349,024 and 1,646,667, all of which have been heretofore referred to.

The instant invention, however, proceeds farther and provides for the automatic change of state of not only cross totalizers, but the column totalizers as well, by a combined and compact grouping of controls not heretofore known, as far as I am aware, and one wherein the prior devices of the patents mentioned have been improved and simplified to permit of greater flexibility and combination.

In carrying out this feature of the invention, there is provided a unitary selector member equipped to control the states of the respective cross totalizers and the particular column totalizer, with which latter it is adapted to be removably associated and relatively to which it may be separately supported.

To enable such unitary selector members to function so as to automatically and variously determine the sort of operation to be effected on the totalizers within their scope, it is desirable that the several state controls be suitably grouped to enable the selector members to more readily set such controls automatically according to any prearranged system.

Figure 2:
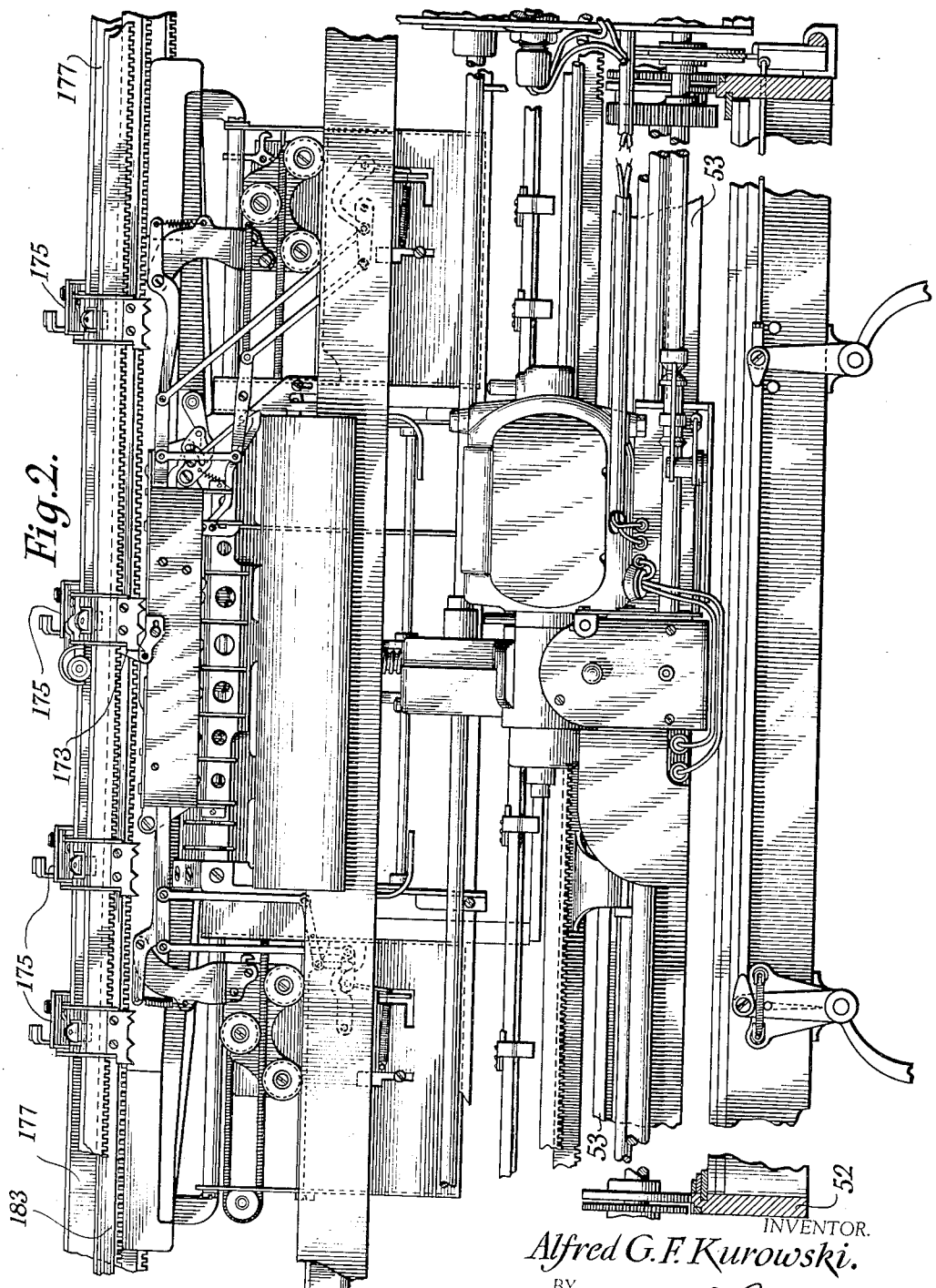
Figure 2 is a view in rear elevation.

For the purpose of concentrating or centralizing the respective state controls, for ready operation by a compact unitary selector, there is provided a guide housing or control box 476 (Figs. 2, 6–11 and 22–27), secured to a stringer 477 (Fig. 6) supported on posts 478 projecting rearwardly from the rear face of the track bar 182, and to a rearwardly protruding bulge formed on the track bar casting (Fig. 2).

The opposite end walls of the housing are suitably slotted, as at 479 (Figs. 10 and 11), to accommodate and guide a series of transversely arranged automatic state control levers 480–485, respectively, (Fig. 6) appropriate to the individual state control shafts 264, 451, 268 and 461 associated with the several column and cross totalizer mechanisms. In other words, each separate state determining means which, in the present instance, includes an add-subtract control, and a neutralizer control for the right hand cross totalizer; an add-subtract control and a neutralizer control for the left hand cross totalizer, and an add-subtract control and a neutralizer control common to the several column totalizers, is connected to a separate control lever of the series 480–485 shown in detail in Figs. 14–19, the control levers differing somewhat from one another in detail, but all operating similarly:

The control levers are all nested, grouped or confined in closely adjacent parallelism lengthwise of the control box and may be all conveniently mounted on a fulcrum rod 486 (Figs. 6 and 7) suitably supported at its ends in the outer rear wall of the housing 476 and in a bracket 487 projecting from the left-hand end wall (in said figures). A transverse brace bar 488 secured to the inner rear wall of the housing, is slotted to accommodate the control levers 480–485 and serve as a guide and support therefor intermediate their ends.

The control levers shown in Figs. 14 and 15 are appropriate to the right-hand cross totalizer, the lever 480 controlling the add-subtract condition thereof, and lever 481 controlling the neutralizing of the cross totalizer. From the fulcrum rod 486, each of the levers 480, 481 has a leftward (looking from the rear) extension passing out of the control box 476 through its individual guide slot 479, a link 489 (Fig. 2) pivotally connecting the extension of lever 480 with an arm 490 on the add-subtract shaft 268, the extension of the control lever 481 being connected by a link 491 and lever 492 with a short link connected to an arm 493 on the neutralizer shaft 461.

Control levers 482 and 483 (Figs. 6, 16, 17, 22 and 23) are associated with the add-subtract shaft 264, and the neutralizer shaft 451, relating to the main or column totalizer mechanism; the shafts 264 and 451 being rearwardly extended into the area enclosed by the control box 476, and having forked arms 494 and 495, respectively, (Fig. 7) adapted to embrace studs 496 and 497 projecting from depending lugs 498 and 499 individual to the respective control levers 482 and 483. The left-hand ends of the control levers 482 and 483 project through guide slots 479 in the right-hand wall of the control box 476.

The control levers 484 and 485 operate the add-subtract shaft 268 and the neutralizer shaft 461 appropriate to the left-hand cross totalizer, the free ends of such control levers being extended to project through individual guide slots 479 in the left-hand wall (viewed from the front) of the control box 476. A link 500 (Figs. 2, 3 and 28) pivotally connects the extended end of the control lever 484 with an arm 501 on the add-subtract shaft 268. A link 502 pivotally connects the extended end of the control lever 485 with one end of an intermediate lever 503, a second link 504 pivotally connecting the opposite end of the intermediate lever with an arm 505 fast on the neutralizer shaft 461.

Springs 506 connected to individual tails depending from the respective control levers below their fulcrum 486, tend to hold the free ends of the levers 480–483, and the link-connected ends of control levers 484 and 485 at their upper limits of travel.

Individual tappets 507 are mounted on each of the control levers 480–485, at like distances from the common fulcrum 486 of the control levers, so as to lie in alignment from front to rear.

Headed studs 508 pass through hooked slots 509 formed in the respective tappets, and arms 510 project laterally from the tappets and lie alongside their individual control levers to which they are connected for independent movement by headed pins 511 passing through slots 512 arranged longitudinally of the arms. Springs 513 extending from the lower ends of the tappets to their individual control levers serve to normally maintain the tappets in their upper positions with the laterally extending ends of the hooked slots 509 fitted about the studs 508, as shown in Figs. 14–19, the tappets having, in effect, a floating connection with their respective control levers.

The closure for the top of the control box 476 is formed of a stationary plate 514, and a sliding cover 515 (best shown in Fig. 27). The plate and cover are cut away to form a T-slot. The upper ends of the tappets 507 project upwardly through the stem of the T-slot, which separates the adjacent ends of the plate 514 and cover 515, the left hand edges of the heads of each tappet being formed in a compound or S-shaped curve, the concave portions of which rest against a limiting rod 516 supported in advance of the inner end of the sliding cover by eyes 517 projecting from the cover. The heads of the tappets are thus confined for operation in the space between the limiting rod 516 and the inner end of the slidable cover 515 in the stem of the T-shaped slot, the rod serving as a back-stop for the tappets when the tappets are shifted endwise relatively to their supporting levers 480—485, as hereinafter explained. One of the eyes is prolonged and longitudinally slotted, as at 518 (Figs. 7 and 27), to embrace the opposed edge of the stationary plate 514 and serve as a guide or pilot for the sliding cover 515, which latter is shiftable endwise longitudinally of the control box, and transversely in relation to the machine, to silence the automatic state control, as hereinafter explained. Pins 519 (Figs. 10 and 11) mounted in the control box pass through slots 520 formed in the slidable cover 515 and in a flange adjacent the outer eye 517 to guide and limit the movement of such cover as well as secure it on the control box.

Unitary selector

One or more unitary selector devices (Fig. 12) cooperate with the nest of state controls within the control box 476 and its control levers traveling with the key carriage, such unitary selector devices being conveniently mounted for detachment and adjustment on a supporting bar 530 (Figs. 2, 3, 13 and 22-25) lying parallel with and directly behind the carrier 177 for the column totalizers. The supporting bar is secured at its opposite ends in seats formed in the forwardly projecting upper ends of the bracket extensions 155.

Each of these unitary selector devices may conveniently include a pair of complementary, forked side frames 541 (Figs. 12 and 13) spaced apart substantially the width of a column totalizer and arranged in parallelism to form a double jaw, the upper jaw sections of which are connected by a flat bridge plate 532 located above the throat opening. A brace 533 connects the lower jaw sections at points behind the closed end of the throat, the throat being of sufficient width to accommodate the supporting bar 530, the under face of which is provided with a series of transverse grooves, as at 534, to correspond with the width of the letter spacing, generally one-tenth of an inch. To place the unitary selector on the supporting bar, the open mouth of the throat is positioned opposite the rear edge of the bar at the particular location desired, the open ends of the jaw sections being slightly rounded or beveled to facilitate entry of the lower jaws into the grooves 534, after which the selector is slid forwardly, forcing it over the bar until the closed inner end of the throat abuts the rear edge of the bar. A flat bow spring 535 conveniently secured to the under face of the bridge 532 of the selector, frictionally engages the upper face of the supporting bar 530 to take up play and prevent vibration and chattering of the selector on the bar, as well as to hold the selector in place.

Opposed ears 536 rising from the upper edges of the respective upper jaws of the forked side frames 531 support a pivoted, manually releasable, spring-pressed latch 537, the forward wide-toothed end of which is adapted to project over the front edge of the supporting bar 530 when the selector is in place, the tooth being reentrant to engage a groove 538 extending longitudinally of the forward or inner edge of the supporting bar, to secure the selector unit where adjusted against accidental disconnection.

The rear end of the latch 537 terminates in a finger piece, depression of which releases the toothed end from the bar, whereupon a rearward pull on the selector unit results in the removal of the latter for readjustment if necessary, or the substitution of another unit.

A row of apertures 539 spaced according to the lateral spacing between the tappets 507 of the successive automatic state control levers 480-485, are formed in each of the lower jaws of the respective selector units, the corresponding apertures of each row being in registry to accommodate the tenons 540 of a series of cam blades 541. The cam blades lie in the direction of travel of the key carriage and its control levers, the lower edges of the cam blades depending below the lower edges of the forked frames 531 to enable the beveled heads of the tappets 507 to contact with the lower edges of the cam blades.

There are as many pairs of apertures 539 as there are state control levers, but obviously no selectivity would be afforded by providing each selector unit with a full set of cam blades. Instead, cam blades 541 are mortised into the apertures 539 according to the particular state of the respective column and cross totalizers which it is desired shall obtain in a particular calculating zone.

Owing to the centralization of the control levers 480-485, a single unit selector simultaneously determines the states of the respective cross totalizers and of the particular column totalizer with which such unitary selector is associated.

Thus any selector unit may have its cam blades so arranged as to set the various state controls (for the column totalizer, and for the separate cross totalizers) differently from any other selector unit, and each selector unit may adjust the state controls differently, or certain of the selector units may automatically affect the state controls similarly, while other selector units effect changes in the adjustment of the state controls, and in any sequence.

And by mounting the cam controls on a unitary selector separate from the totalizers and demountable relatively thereto, a greater flexibility, and range of adjustment is permitted a machine so equipped.

The selectors are supported separately from the column totalizers, but are associated therewith or juxtaposed relatively thereto, so as to control the states of their particular column registers simultaneously with their control of the respective cross totalizers. Because of the flexibility permitted by the invention, some forty-two possible combinations being provided in the present illustration, it is clear that a selector may control the state of its associated column totalizer to effect adding while simultaneously setting the state control mechanisms to effect subtraction on one cross-totalizer, and neutralize the remaining cross totalizer, for example, or any other combination of such states.

Furthermore, by mounting the state control cams on selector units and not on the column totalizers themselves, a material reduction in expense is effected, since it is only necessary for the operator to be provided with as many different selector units as will produce the required controls for the proper working of the particular system in use.

A selector may be associated with any column totalizer, it being preferable that the cam blades 541 of the selector shall be of a length sufficient to maintain engagement with the tappets 507 of the nest of control levers 480–485 throughout the computing zone.

The selector shown in Fig. 12 is designed to automatically set the corresponding control levers to effect subtraction in the right-hand cross totalizer, subtraction in the column totalizer with which it is associated, and to neutralize the left-hand cross totalizer, because of the positioning of the cam blades 541 in the first, third and sixth positions from the mouth of the throat of the selector. Other combinations are readily apparent.

*Positioning the selectors*

Since the selectors may be used frequently with cross totalizers, or even with column totalizers of various capacities, the operator might become confused in setting up the machine to work according to a predetermined system, were it not for the provision of suitable indications designed to assist the operator in properly arranging the controls.

Although the traveling master wheels 205, 238, are brought to the totalizer wheels of highest order first, the operator, when positioning the selectors on the bar 530, will disregard this fact, and will adjust the selectors according to the units totalizer wheels which, of necessity, must all lie in mesh with their master wheels synchronously.

Referring to Figs. 1 and 3, the strap 173 carries at its upper end a forwardly and rearwardly extending index plate 542, the forward end of which plate bears on index mark corresponding at all times with the position of the master wheel 265 for the column totalizer, and the rear end of which plate bears an index mark with which the indicator finger 544 of each selector must aline as the master wheel 205 is about to enter the successive adding zones or columns, to insure the conditioning of the state controls. Also an index plate 543 (Fig. 5) is mounted on the web of the traveling rail 182 above each cross totalizer master wheel 238, to indicate the positions of the latter with regard to the wheels of their respective cross totalizers.

The right hand side frame 531 of each unit selector carries an upwardly projecting index finger 544 (Fig. 12) to co-act with the rear indx mark on the plate 542.

The column totalizers are first positioned on their track bar 177 according to the columns or zones in which the amounts printed are to be calculated, and define such zones.

Both the column and cross totalizers are each provided with graduations along their rear edges indicating the positions of the accumulating wheels of such totalizers, and after positioning the column totalizers as desired relatively to the columns on the work sheet, the key carriage with its column and cross totalizer master wheels, is advanced in letter-spacing direction from left to right, (in the Elliott-Fisher type of machine), to bring the units wheel graduation of the first column totalizer opposite the forward index mark on the index plate 542, whereupon the rear index mark on said plate indicates the position at which the desired unit selector should be attached to its supporting bar 530, with its index finger 544 in line with such rear index mark.

The key carriage is then manually slid along its ways to engage the pick-up beams 231, appurtenant to the respective cross totalizer trucks, with the adjusted selector, as more fully explained hereinafter, and the parts again brought to the units aligned position of the first column totalizer and the index plate. This will result in locating the respective cross totalizer trucks leftward from their normal or home positions. The cross totalizers are then applied to their trucks in such relation to their respective index plates 543, that the units graduations on the cross totalizers lie in line with the master wheel position-indicating marks on such index plates, thus completing the adjustment.

The above method of co-relating the selectors with their column and cross totalizers is repeated for each column totalizer after the first when adjusting the several column totalizers relatively to their respective columns at the beginning of series of operations.

*Operation of state controls by the selectors*

Upon entering a calculating zone, the key carriage traveling from left to right, with its grouped automatic state control levers 480–485, will first cause the oppositely beveled heads of the tappets 507 (Figs. 14–19) of the respective control levers to ride underneath the selector member associated with that zone. The heads of those tappets which travel in the vertical planes of the particular cam blades 541 with which the selector may be provided, strike the left hand ends of the alined cam blades 541, this contact serving to more firmly fit the lateral seats at the lower ends of the hooked slots 589 (Figs. 14–19) around the studs 568 on the control levers, and in effect, locking the tappets in their upper positions relatively to the control levers.

As the key carriage continues its advance towards the right, the pressure resistance afforded by the end edges of the cam blades 541 to the passage of the beveled heads of the tappets causes the particular control levers which carry these tappets to rock downwardly against the tensions of their restoring springs 596, and through their respective linkages these movements of the control levers are communicated to their state control shafts 264, 451, 268 and 461, or any of them, to set or silence the corresponding master wheel controls depending upon the combination of cam blades mounted in the selector.

The amount typed in the particular computing zone is thus either entered additively or subtractively, or not entered in the corresponding column totalizer and in the cross totalizers.

Absence of a cam blade 541 in one or more of the six positions provided in the form of selector shown, enables the control lever corresponding in position thereto, to remain in its normal position, which in the embodiment herein illustrated, conditions the column and cross totalizers for addition, it being readily understood that the parts might be arranged for normally effecting subtraction instead of addition.

As the key carriage with its nest of control levers and master wheels escapes from a computing zone, the heads of the operated tappets 507 ride out from beneath their corresponding cam blades 541, whereupon the tensioned springs 596 rock the depressed control levers and their tappets upwardly to their normal positions preparatory to their contact with the succeeding unitary selector, restoring the add-subtract controls to "add" condition and the neutralizer controls to their ineffective positions.

Upon the return of the key carriage to the beginning of a line, the control levers 480-485 and their tappets 507 approach the stationary unitary selectors from the opposite direction.

Consequently, contact of the beveled heads of the tappets with the left hand ends (Fig. 20) of the cam blades 541 operates to detain the tappets 507 temporarily while the carriage and the tappet-supporting levers 480-485 continue their return movement. This temporary arrest of the tappets will disengage the pins 508 from the hooked seats of the tappets and position the pins in line with the vertical portions of the slots 509, so that as the tappets ride beneath their cam blades, the tappets will be rocked idly downwardly relatively to their control levers about the pivots 511 and against the tensions of their springs 513, as shown, without affecting the state controls. There is a slight clearance (shown in dotted lines in Fig. 22) between the rod 516 and the adjacent edges of each of the tappets 507, but additional clearance may be provided if that shown is insufficient to enable the tappets to be depressed relatively to their levers 480-485, at which times the tappets must be disengaged from their studs or pins 508, as in Fig. 20, which necessitates a restricted endwise movement of the tappets 507 relatively to their supporting levers 480-485 and in the direction of the rod 516.

As the key carriage passes the last selector, on its return, the springs 513 finally restore the tappets to their normal raised positions, and, due to the angle at which the springs are arranged, they contrive to again fit the hooked seats at the lower ends of the slots 509 of the tappets over the pins 508.

*Selectors determine which cross totalizers shall become operative and control decimal spacing*

Heretofore, it has been the practice, generally, to fixedly mount a state control and the decimal skip space controlling mechanism on the column totalizers (Foothorap, No. 1,421,201, issued June 27th, 1922), and to arrange that the usual pick-up mechanism for the cross totalizer, or for the actuator therefor, shall cooperate with a part of the column totalizer (Wahl, 1,270,471, June 25, 1918).

As an improvement upon the former arrangement, and by way of greater centralization of controls, the unitary selectors of the present invention by which the various states of the totalizers are determined, also determine the selection of the cross totalizers.

Furthermore, the control of decimal spacing, also is herein associated with the unitary selectors, and extended in scope to control intercolumnar spacing in instances where the column totalizers are closely spaced.

Depriving the column totalizers of the cross totalizer pick-up and decimal spacing control functions relieves the column totalizers of shock and strain and tends to reduce the liability of errors, and displacements.

*Pick-up for cross totalizers*

Reference has heretofore been made to the cross totalizer trucks 228 (Figs. 2 and 5) mounted for movement on the guide rails 227 relatively to the key carriage, each such truck having an upwardly extending fixture 233 secured thereto, to the upper parts of which, the outer ends of the respective pick-up beams 231 are pivotally connected, at 232.

Springs 234 normally hold the cross totalizer trucks at, and return them to, their normal positions at the right hand limits of their travel.

The pick-up beams 231 extend towards each other and overlap, as shown in Fig. 27, lying side by side along the inner side of the control box 476, parallel with and adjacent to the stringer 477 supporting the control box, and in registry with the longitudinal slot forming the cross bar of the T-shaped opening in the cover of the control box.

The pick-up beams 231 are guided in individual slots 479 in the ends of the control box through which they pass, each beam being offset downwardly from a point adjacent its pivot 232, the reach of the beam gradually inclining upwardly from the offset until its free end lies substantially in the same horizontal plane with its pivot. Springs 550, (Fig. 2) connected to the tails of the respective pick-up beams, tend to rock the free ends thereof upwardly, such movement being limited by contact of the edges of the beams with the fixed closure 514.

Check members 551, (Figs. 6, 7 and 25-27), project upwardly from points intermediate the ends of the pick-up beams, such check members extending upwardly through the longitudinal slot in the control box closure to engage the unitary selectors.

To enable the unitary selectors to control the pick-up of the cross-totalizers whereby to effect simultaneous operation of the cross totalizers, or either of them, and the successive column totalizers as the totalizer operating mechanism is brought by the advance of the key carriage to the successive computing zones, the lower jaw of each left hand selector frame member 531, as viewed in Fig. 25, is provided near its mouth with a depending fin 552 (Figs. 12 and 13), which, as shown, may be long enough to extend across the parallel paths of both check members 551, but obviously may be short enough to lie in the path of either check member to the exclusion of the other, or may be entirely omitted in instances where the selection of a cross totalizer is not desired, in which last-named event, the amounts accumulated in a column totalizer will not be registered in either cross totalizer.

The springs 234 (Figs. 3 and 5) normally maintain their respective cross totalizer trucks 228 with the cross totalizers mounted thereon, at their right hand limits of travel, (as viewed from the front) and since the pickup beams 231 are connected with the trucks, the beams are likewise normally positioned at their right hand limits of travel with their check members at the left hand end of the longitudinal opening in the control box closure 514, 515 (see Figs. 25-27).

The cross totalizer trucks and pickup beams normally travel with the key carriage and grouped state control levers in letter spacing direction to bring the master wheel 205 successively to the stationary column totalizers.

As the key carriage approaches a computing zone defined by a column totalizer, either or both of the upwardly-projecting check members 551 impinge against and are arrested by the fin 552 on the lower jaw of the selector, thereby arresting the trucks 228 and their cross totalizers which remain stationary as the key carriage traverses the computing zone, to enable the entry of digits on wheels of corresponding denominations in the cross totalizers and the active column totalizer.

Detents 553 pivoted at 554 on the respective pick-up beams adjacent the check members 551, project upwardly in spaced relation to their individual check members and coact therewith in gripping the arresting fin 552 to prevent accidental disengagement of the pick-up beams and selector, or relative movement thereof during the passage of the key carriage through a computing zone.

The upper ends of the detents 553 and the check projections 551 are oppositely sloped as shown, to contact with and ride beneath the arresting fins 552 of the selectors as the key carriage advances and returns, respectively. Lips 555 on the tails of the respective detents overlie their pick-up beams, and springs 556 attached to such tails operate to restore the detents to their effective positions immediately upon escaping from beneath the fins, he detents being slightly less height than the check projections.

As the key carriage and control box leave a computing zone, after the entry of the units digit on the units wheels of the totalizers, abutments 557 (Figs. 25-27) on the under surface of the closure 514 near the opposite ends thereof, wipe over cams 558 formed on the pick-up beams 231, to rock the latter downwardly on their pivots 232, and release their check members 551, and detents from contact with the arresting fin 552, as shown in dotted lines in Figs. 25 and 26, after which the springs 234 (Fig. 3) snap the cross totalizers back to their normal positions, preparatory to the arrial of the key carriage at the next computing zone, and the springs 556 restore the pick-up because beams 231 to their elevated positions.

Automatic spacing for punctuation

To enable the unitary selectors to control the decimal spacing between denominational orders, as in writing the numbers "4 987 65" and "4987 65," resort is had to an improved form of the mechanism shown in Foothorap, 1,512,282, heretofore mentioned. To this end, the brace 533 (Fig. 12) connecting the rear ends of the frame members 531 of the unitary selector, supports a decimal spacing trip bar 559 (Figs. 2, 12, 13 and 22-24Q parallel with cam blades 541, and having a serrated lower edge. A tooth 560 former on one end of a double bell crank 561, pivoted at 562 (Figs. 6 and 7) to the inner face of the rear wall of the control box 476, co-acts successively with the serrations on the lower edge of the decimal trip bar 559, which operate to rock the bell crank 561 downwardly against the tetnsion of a spring 563 (Fig. 7) as they wipe successively over the tooth 560. The depending arm of the bell crank is offset and formed with a hook 564 releasably engaging a headed stud 565 on the upper end of a vertically depending rod 566, corresponding with the rod 95 of Foothorap Patent 1,512,282, and connected to the letter spacing escapement, not herein shown, but fully disclosed and explained in the said patent. The spring 563 conventionally shown in Fig. 7, corresponds to the spring 35 of Foothorap Patent 1,203,519.

The form of decimal spacing bar shown is arranged for correctly spacing the printing of an amount of six denominations as "4 987 65," ie being observed that automatic decimal spacing is provided between the thousands and the hundreds denominations and between the units of dollars and tens of cents denominations.

The tooth of the decimal spacig bell crank 560 conveniently lies in alinement with the row of tappet heads 507, but does not extend upwardly as far, to compensate for which the serrated edge of the decimal spacing trip bar 559 depends to a plane below the lower edges of the cam blades 541 which effect operation of the state control levers.

Automatic multiple spacing

At times, it is desired to print two columns of closely adjacent figures, as when printing quantities and amounts, for instance, which would appear as follows:

987|5 41|
883|2 67|
741|3 88| and to accumulate the totals of both columns.

To accomplish these results, it is necessary to position the respective column totalizers and their selectors in close juxtaposition.

In order to effect the automatic spacing or jumping of the key carriage and its column totalizer master wheel 205 from the units totalizer wheel of the first column totalizer to a position in engagement with the wheel of highest denomination in the adjacent totalizer, to carry the master wheel across the thickness of the juxtaposed walls of the two totalizers, and the space between the totalizers, each decimal spacing bar 559 is provided with a toother extension 567 (Figs. 12, 22-24) projecting laterally beyond the side wall 531 of its selector frame so as to lie in proximity to and co-act with a tooth formed on the end of the decimal spacing bar on the adjacent selector, whereby to maintain the letter space escapement mechanism displaced, and automatically effect a skipping of the key carriage in a single movement from the units wheel of one totalizer to the wheel of highest order in the adjacent totalizer.

It is not necessary that the neighboring ends of the decimal spacing trip bars be in actual contact, so long as the distance therebetween is less than the breadth of the tooth on the co-acting bell crank 560, to prevent restoration of the bell crank to normal intermediate the closely positioned selectors.

Silencing the automatic state determining means

To accommodate the invention to special uses, as when one or more items occur which require special treatment not provided for by the particular automatic conditioning of the machine at that time effective, means is provided which enables the operator, by manually operating a single finger piece, to temporarily discontinue or interrupt the effectiveness of the automatic state control mechanisms, for the purpose of thereafter manually conditioning the machine for the entry of such special items, after which a re-adjustment of the finger piece re-establishes the former pre-arranged system of automatic state control.

A handle or finger piece 570 (Figs. 4, 5, 9-11) is fast on the front end of an intermitting shaft 571 journaled in the hood 178 of the key carriage and extending from front to rear thereof. The rear end of the shaft projects through the rear wall of the hood and carries an arm 572, (Figs. 7, 8, 10, 11, 22-24), the upper edge of which lies at an angle to and is adapted to co-act with a stud 573 projecting from one end of a crank 574, the opposite end of which crank is pivoted at 575 to an ear 576 projecting from one end wall of the control box 476. The crank has a cam slot 577 formed therein to accommodate a pin 578 fast on a lug 579 depending from an extension of the shiftable cover plate 515 of the control box.

Normally, the inner end 580 of the cover plate 515 is withdrawn from proximity to the tappets 507 of the automatic state control levers 480-485, the limiting rod 516 of the cover lying spaced apart from the series of tappets.

The finger piece 570 may be provided with an indicator 581 (Fig. 5) co-acting with the spaced indicia "D" (Disconnect) and "C" (Connect), on the hood of the machine.

The finger piece, when rocked to the "D" position, turns the intermitting shaft 571 to press the upper edge of the arm 572 against the stud 573 on the crank 574, stressing the return spring 583, and rocking the crank upwardly from the position shown in Fig. 10 to that shown in Fig. 11, during which the wall of the cam slot 577 crowds the pin 578 to the left (in said figures) to slide the cover plate 515 to the left. A socket 582 in the arm 572, by fitting around the stud 573, limits the throw of the handle 570 in one direction and latches it in its "Disconnect" position.

The edge 580 of the cover plate, as the latter shifts to the left, contacts the opposed inclined edges of the state control tappets 507 and first forces the tappets bodily to the left to unseat the hooked portions of their slots 509 from their locking pins 508, and thereafter, by continued pressure against the inclined edges of the tappets, cams the latter downwardly from the position shown in Fig. 23 to that shown in full lines in Fig. 25, against the tensions of the individual tappet springs 513. The tappets 507, when thus depressed, lie below the lower edges of the cam blades 541, and do not contact the latter as the key carriage and its grouped state control levers 480-485 advance in letter spacing direction.

The springs 506 of the state control levers, being superior to the tappet restoring springs 513, maintain their levers in their normal raised positions, as the tappets are depressed by the edge 580 of the cover plate or silencing slide, so as to normally maintain an "adding" state in the totalizer actuating mechanism.

The tapered heads of the tappets may be notched as shown, for the purpose of catching upon the edge 580 of the silencing slide or member 515 to limit the extent of displacement. While the automatic state control is thus interrupted, the operator may variously set the manual controls to condition the machine according to the particular sporadic item or items requiring a different set-up from that provided by the general system.

To restore the add-subtract and neutralizer mechanisms to the automatic control of the selectors, it is sufficient merely to return the intermitting shaft 571 to the "Connect" position, which unlatches the arm 572 from the stud 578, whereupon the spring 583 returns the parts to normal, drawing the sliding cover 515 to the right (in the figures) to free the tappets 507 to the action of their individual springs 513, which restore them to their effective positions.

The tappet depressing edge 580 of the sliding cover 515 is recessed, as at 584, (Figs. 8, 10, 11 and 27), to avoid interference with the decimal letter spacing bell crank 590, when it silences the state-control tappets, it being desirable to maintain the automatic decimal spacing effective when the state controls are manually set, as well as when automatically set.

Suitable interlocking mechanism, not shown but well known in the art, may be provided to prevent adjustment of the "Connect" and "Disconnect" handle 570, and the "Hand" and "Power" handle 409, while the key carriage is in a computing zone.

*Manually setting state controls*

After the automatic state control mechanism has been silenced by the intermitting handle 570 and its connected mechanism, the operator may proceed to manually set the state controls to such different combination as is required by the special item to be entered.

As the great majority of operations involve addition, the separate add-subtract controls of the present invention are arranged to be yieldingly held in and automatically returned to their adding positions, the "neutralizer" controls being similarly held in and returned to their idle positions.

It will be remembered that spring 267 (Fig. 4) connected to a stud on the add-subtract control shaft 264 through which the direction of rotation of the column master wheel 265 is determined, normally holds the shaft 264 in and returns it to its "Add" position.

Similar springs 258 (Fig. 2) connected to radial pins 259 fast on the respective right and left cross totalizer add-subtract shafts 268 operate in like manner on their shafts.

And the state control lever springs 506, (Fig. 22), supplement the above-named springs in yieldingly maintaining the several Add-Subtract controls normally in their "Add" positions, and the Neutralizer controls in their idle or "Off" positions.

Therefore, ordinarily, whenever the state control levers 480-485 are not affected by the cam blades 541 of the self-contained selectors, the state controls return to their normal positions.

In view thereof, means is provided to facilitate shifting the several controls to, and maintaining them in the positions from which they would ordinarily be returned, as long as occasion may require.

The state controls may be manually adjusted by turning the respective add-subtract indicating pointers 266, 274, (Figs. 4 and 5) fast on their respective shafts 264, 268, from the "A" to the "S" positions, and by turning the neutralizer indicating pointers 460, 464 (see also Fig. 30), connected with their shafts 451, 461, from their blank to their "N" positions, as heretofore suggested, but I have provided a more readily operable means for manually adjusting the state controls, and for maintaining them where adjusted against the influence of their return springs. To this end, the tails of the add-subtract indicators 266, 274 fast on their control shafts 264, 268, and the tails of the neutralizer indicators 460 and 464 through which the neutralizer shafts 451 and 461 may be controlled, are arranged at an incline across slots 590 (Figs. 5 and 30) formed in the front walls of the hood 178 and of the cross totalizer housings, respectively.

Each slot 590 in the hood 178 accommodates the broadened knurled end of a setting finger or member 591 projecting outwardly from a slide 592 shiftable behind the front wall of the hood, and held in place by a plate 593 fastened to the inner face of the front wall. Lateral pressure in one direction against a knurled finger 591 forces the edge of the latter against the inclined tail of its associated indicating pointer and rocks the pointer and its state control shaft to its opposite limit of movement against the tension of its restoring spring, whereby to shift the reverse gear pinion and differential segment for subtraction, or to displace the clutch shifter arm 218 to neutralize the totalizers, as the case may be. The state-control shafts, by reason of their connections with their respective automatic state control levers 480–485, will rock such levers downwardly, and thus tension the return springs 506. The excursions permitted each of the setting fingers 591 in their slots 599 is sufficient to enable the fingers to pass beneath the free ends of the tails of their indicating pointers, at which point the fingers are arrested, to hold the indicators and hence, their state control shafts, where adjusted, against the tensions of their respective return springs.

Shifting the setting fingers 591 along their slots in the opposite direction releases the indicating pointers and their state control shafts to the action of their return springs which restore the state control mechanisms to normal.

The setting mechanism for the respective state controls of the cross totalizers differs from that above explained for the column totalizers, only in that the setting fingers are in the form of levers 594 (Fig. 4) pivoted at 595 to overlying brackets 596.

Obviously, the setting fingers 591 and 594 must be returned to their idle positions prior to re-establishing the automatic state controls, to avoid interference with the predetermined automatic setting of the state controls by the selectors 531.

*Disabling automatic state control when converting the machine from calculating to typewriting*

Reference has heretofore been made to the "Hand" and "Power" crank 400 (Figs. 4, 5, 8–11) fast on its shaft 401, rotation of which in one direction or the other, shifts the key lever slide 404 to disconnect or connect the companion key levers, and establish or disestablish the control thereof over the power actuator 275.

In addition to the foregoing functions, the hand and power crank also determines the effectiveness and ineffectiveness of the automatic state controls.

To this end, a link 597 pivotally connected by its upper end at 598 to the slide-operating lever 574, is forked at its lower end, one prong of the fork being slotted as at 599, to accommodate a headed and elongated pin 600 mounted on an arm 601 extending radially from the hand and power shaft 401. The upper end wall of the slot 599 normally lies adjacent the headed pin 600, because of the action of spring 583 on the cam-slotted lever 574.

Assume the parts to be in position establishing the automatic state controls, and that it is desired to set the machine for hand operation, that is, for performing typewriting only. The hand crank 400, when rocked clockwise (Fig. 5) or counter-clockwise when viewed from the rear, as in Figs. 7, 8 and 11, will turn the shaft 401 and its arm 601 to press the pin 600 against the upper end wall of the slot 599 and raise the link 597, thereby swinging the cam-slotted lever 574 upwardly, as shown in Fig. 8. As the lever 574 rocks upwardly, its cam slot 577 operates upon the pin 578 of the sliding cover 515 to shift the latter to the left (Figs. 22–24) so that its free edge 586 cams downwardly the tappets 507 of the automatic state control levers 480–485, just as when the "Connect" and "Disconnect" hand crank 570 is operated. The tappets then lie below the plane of the cam blades 541 and hence beyond the control thereof.

However, in converting the machine from a combined calculating and writing machine to a purely writing machine, it is desirable, also, to silence the automatic decimal spacing mechanism to prevent the occurrence of unnecessary letter spacings between the letters of a word, for instance.

Therefore, intermediate the arms 417, 601 of the multiple-armed member on the rear end of the hand and power shaft 401 is an ear 602 to which is pivotally connected the lower end of an irregularly shaped, laterally extending link 603, the upper end of which is pivotally connected at 604 to the head of the depending letter space trip rod 566.

It will be recalled that the tail of the double bell crank 561 grouped with the nest of automatic state control levers 480–485, is hooked, as at 564, to take over the headed stud 565 on the upper end of the letter space trip rod 566.

Upon rocking the shaft 401 counter-clockwise from the "Power" position shown in Fig. 7 to the "Hand" position shown in Fig. 8, the ear 602 thrusts the link 603 to the left (in the figures) flexing the trip link 566 and forcing its headed stud 565 out of the flaring mouth of the hook 564 of the decimal space controlling bell crank 561, to enable a spring 568 to rock such bell crank and lower the toothed end 560 thereof out of the plane of travel of the serrated edge of the decimal spacing trip bar 559, as shown in Fig. 8.

The hand and power crank 400, when returned clockwise to the position shown in Fig. 7, shifts the key control slide 404 to disconnect the complementary key levers, to condition the keys for power operation.

Furthermore, the shaft 401 lowers the arm 601 with its elongated stud 600, the link 597 following the stud, under the influence of the spring 583 on the cam-slotted lever 574, the operation of which shifts the silencing slide cover 515 to the right, viewing Fig. 8, to release the tappets 507 for return by their individual springs 513 to their effective positions.

The ear 602 also returns with the arm 601 to the position shown in Fig. 7, drawing with it the link 603 and the upper end of the letter escapement trip rod 566, the stud 565 of which rides along the restricted throat of the hook 564 and rocks the bell crank 561 upwardly to restore the toothed end 560 thereof to effective position, against the tension of spring 568. Stops 611 limit the rocking movement of the decimal spacing bell crank, in either direction.

*Carriage return key control of the automatic state determining means*

The carriage return key 70 (Fig. 9) controls the carriage return clutch mechanism 110, 111 (Figs. 1 and 35), whereby to return the key carriage under power to the left hand margin of the work sheet, as shown more fully in U. S. patent to Foothorap, 1,904,127, April 18, 1933, and in my parent application Serial No. 687,547, of which this application is a division.

The motor returns the key carriage smartly to the beginning of a line, and to prevent the noise which would be occasioned by contact of the pointed ends of the tappets 507 against the cam blades 541, during such key carriage return, means, operable by the carriage return key, is provided to silence the tappets.

The carriage return key, when depressed, rocks the bell crank 122 (Figs. 8, 9 and 35) on the shaft 123 from which the trip finger 124 depends, to operate the universal bail 125 controlling the carriage return clutch mechanism. A push bar 606 connected at its lower end, at 607, to another arm of the bell crank lever 122 extends upwardly, and terminates at its upper end in a lip 608 located beneath and in line with the lower slotted end of the silencing link 597 for the state-control tappets. A stud 609 on the frame of the key carriage projects through a slot 610 intermediate the ends of the push bar 606, to guide the latter in its vertical movement.

The push bar 606, when shifted upwardly upon depression of the carriage return key 70, contacts its upper end with the lower end of the silencing link 597 to force the latter and its cam-slotted lever 574 upwardly and shift the silencing slide 515 to the position shown in Figs. 8 and 24, to lower the tappets 507 to their idle positions.

The carriage return key 70, when released, restores to normal with its connected parts, drawing the push bar 606 downwardly and enabling the spring 583 of the cam-slotted lever 574 to restore the silencing slide 515 and the link 597 to their normal idle positions, thereby releasing the tappets for restoration to their effective positions.

*Case shift key control of the state determining means*

Occasion may arise when the operator will desire to write a word or words in one or more columns or computing zones for some special purpose.

Use of the usual letter keys while the key carriage is in a computing zone would not prevent the occurrence of the automatic decimal spacing which would impair the appearance of the work and reduce the number of letters which could be printed in a column.

Furthermore, it may well be that the wording to be entered in a computing zone is of such significance as to merit special notice and hence should be printed in capital letters in a contrasting color to that in which the general run of items is printed.

Also such special entry may include the printing of numerals which are not to be accumulated, or form part of the particular calculation for which the state controls may be set at that time.

Means under the control of the usual Elliott-Fisher case shift key 71, (Fig. 9), disclosed, for example, in Foothorap, U. S. Patents 1,119,148, December 1, 1914, and 1,459,200, June 19, 1923, has been devised to provide for the several contingencies above noted.

In the present invention, a camming stud 615 providing from one side of the case shift key 71, lies adjacent the angular end of an upwardly projecting arm 616 fast on a stub shaft 617 suitably supported in the key carriage frame. A second arm 618 fast on the stub shaft, extends rearwardly and has pivoted thereto a link 619, connected at its upper end to a rearwardly extending operating arm 620, (Fig. 10), pivoted at 621 to the key carriage frame. The operating arm 620 extends beneath and in operative relation with one of the prongs at the lower forked end of the silencing link 597, the free end of the operating arm being first laterally and then upwardly bent to form a finger 622 lying beneath the outer end of the elongated stud 600 carried by the arm 601 fast on the hand and power shaft 401.

The shift key 71, when depressed, operates in the manner disclosed in the Foothorap patents heretofore mentioned, to rock downwardly a shaft 623 (Fig. 1) carrying the trip ring arm 624 to position a trip ring 625, into the paths of the horns 626 on the adjustable type carriers 627 pivoted on the respective type bars 340.

The shift key also operates the ribbon shift mechanism, not herein shown, but fully disclosed in the Elliott-Fisher machine, and in U. S. Patent to Foothorap, 1,286,573, issued December 3rd, 1918, to position a field of contrasting color over the printing line.

Furthermore, the shift key 71, when depressed, causes its stud 615 to wipe along the inclined edge of the arm 616 to rock the latter and the arm 618 clockwise (Fig. 9). The arm 618, through the thrust link 619, rocks the short operating arm 620 upwardly, pressing it against the silencing link 597 to shift the silencing slide 515 to effective position to displace the state control tappets 507. The finger 622 on the operating arm contacts the elongated stud 600 on the radial arm 601 of the hand and power shaft 401, to rock the latter and the shaft, together with the ear 602. It will be remembered that a link 603 connects the ear 602 with the letter space escapement trip rod 566, which trip mechanism will be disabled, as heretofore explained, so that no letter spaces will be automatically left where not desired.

Incidentally, the shaft 401, when thus rocked, will shift the key control slide 404 to connect the complementary members 335, 336 constituting the composite keys, and disable the coupler-setting devices 356, (Fig. 1), thereby enabling designating numbers to be printed by pressure of the operator's finger on the numeral key levers, and rendering the power drive ineffective.

A spring 628 (Fig. 9) restores the case shift key to normal, after which, the operator may return the shaft 401 and its connected mechanisms to normal, by the handle 409, and thus restore the machine to the condition existing previously to the depression of the case shift key 71.

*Manually disabling cross totalizers*

Some lines of work may not require the use of either or both of the cross totalizers, but when compiling such work, if the cross totalizers are allowed to remain in their normal positions, they will be idly picked up each time the key carriage arrives in a computing zone, and released when the key carriage leaves such zone, to return under the influence of their springs 234 to their normal positions, preparatory to the arrival of the key carriage in the succeeding computing zone.

The idle operation of the cross totalizers is accompanied by some noise, which, together with the movement of the totalizers, tends to distract the operator.

Of course, it is desired that the cross totalizers be stationary at all times relatively to the key carriage when the machine is used for writing only.

Heretofore, it has been customary to provide latching mechanisms adapted to secure the cross totalizers to their auxiliary frames, and rendered effective simply by shifting the cross-totalizers from their normal positions to their opposite limits of travel, which could be readily accomplished by a flick of the finger sufficient to overcome the tension of the return spring 234.

Objections to this arrangement are that the cross-totalizers may be accidentally impelled to their latched positions, and further, that, because of the ease with which they could be latched in their inoperative positions, the operator often forgot that he had intentially latched the cross totalizers against operation.

To avoid these disadvantages, the cross totalizer trucks 228, (Figs. 2 and 31), each carry a latch 631 pivoted thereto at 632 and projecting towards the left (Fig. 5), the pivots lying in line with the projecting hooked ends of the latches. Apertures 633 (Fig. 9) are formed in the left hand side plates 225 and 226, (Fig. 5) of the respective cross totalizer supporting frames, the apertures lying above and out of line with their respective latches 631, so that should an impulse be imparted to either of the cross totalizers, accidentally or intentionally, to shift the totalizers to their extreme left hand positions against the tensions of their return springs 234, the hooked ends of the latches 631 will strike the imperforate walls of their left hand side plates below the apertures 633, to arrest the cross totalizers, whereupon the springs will immediately restore the cross totalizers to their normal right hand positions.

In the present invention, should the operator desire to lock a cross totalizer out of operation, he will manipulate the finger piece 634 projecting upwardly from each latch to rock the latter upwardly, and, while holding the latch in raised position, will manually shift the cross totalizer to its left hand extreme of travel, which will result in the insertion of the hooked end of the latch 631 within its locking aperture 633, whereupon the operator releases the latch to the action of its spring 635 (Fig. 31) which draws the hooked end of the latch into engagement with the lower wall of its aperture 633 to hold the cross totalizer idle.

In this position, the units wheel of the cross totalizer, of course, lies clear of the master wheel 238.

The operator is thus forced to make a conscious effort in latching the cross totalizers in their idle positions, which is designed to impress upon his mind the fact that he has rendered the cross totalizers ineffective.

The pick-up beams 231, of course, are moved to the left with their respective cross totalizers, the cams 558 (Figs. 25 and 26) riding under their disengaging abutments 557 to swing the check members 551 below the level of the fins 552 on the self-contained selectors.

Manual release of the latches 631 to disengage their hooked ends from the walls of the supporting frames, enables the springs 234 to return the cross totalizers and pick-up beams to their normal positions.

*Cross totalizer control of clear sign printing*

To print the totals disclosed on the cross totalizer dials of a writing and calculating machine of the round or flat platen type, it is generally necessary for the operator to set the accumulator driving means for subtraction and strike the numeral keys corresponding with the digits shown on the cross totalizer bearing the desired total, the remaining totalizers being conveniently locked out of operation or set to neutral, as preferred.

And to advise the operator as to whether or not he has depressed numeral keys of the proper values and in the proper order, means has heretofore been provided under control of the cross totalizer to permit or prevent the depression of a "clear signal" key, depending upon the clear or non-clear condition of the active cross totalizer. Such a mechanism is shown, for instance, in U. S. patent to Hart, 1,737,586, issued December 3rd, 1929, wherein a single cross totalizer controls the operativeness of a single clear signal printing key.

The present invention constitutes an improvement on the former devices by providing a single clear sign printing key common to and controlled by a plurality of cross totalizers.

Such a clear sign printing key 640 (Figs. 3 and 31-34), is shown at the right hand side of the keyboard, as illustrated in U. S. patent to Foothorap, 1,505,384, issued August 19, 1924, and is connected by a suitable linkage (not shown) with a type bar (also not shown) equipped to print a distinguishing sign, as a star, for example, all as fully disclosed in the Foothorap patent.

In the present invention, the clear signal printing key 640 carries an upwardly projecting branch 641 passing through a guide slot 642 in the usual cover plate of the Elliott-Fisher machine, the branch being apertured as at 643, which aperture, when the key is in its normal undepressed position, may conveniently lie at the intersection of the branch 641 with the cover plate.

A dog 644 (Fig. 31) which may be pivoted at 645 to the cover plate or other suitable support, extends forwardly over the cover plate, with its lateral tooth positioned opposite and in line with the locking aperture 643 of the clear signal key branch 641. A rod 646 extending transversely across the key carriage, connects an ear 647 on the dog with one arm of a crank shaft 648 suitably journaled in the hood 170 of the key carriage. An arm 649, one end of which is fast on the crank shaft 648, carries a skeleton cam 650 adjustably mounted thereon and adapted to co-act with the upwardly extending arm of a bell crank 651 pivoted at 652 to the side of the cross totalizer 230. The remaining arm of the bell crank 651 is articulated with the rear end of an elongated arm 653 pivoted to the side of the cross totalizer at 654 and forming, with the bell crank arm to which it is articulated, a toggle connection.

The forward end of the elongated arm 653 supports one end of a cross bar 655 extending across the denominational wheels of the cross totalizer, the opposite end of the cross bar being supported by a short arm (not shown) pivoted to the right hand side of the cross totalizer.

A toothed gear wheel 656 is associated to turn with each denominational wheel, such gear wheels being meshed with the so-called "carrying" wheels of this type of totalizer shown in the before-mentioned Wahl and Kurowski patents, each gear wheel 656 having an abbreviated tooth which, when the denominational wheels disclose zeroes at the sight aperture 656, is located opposite its appropriate rigid feeler 658 of a denominational series of like feelers projecting inwardly from the cross bar 655 in the same vertical planes with the gear wheels 656.

A very light spring 659 connected with the bell crank 651 assists the force of gravity to flex the toggle connection in such direction as to normally swing the cross bar 655 with its feelers 658 towards the gear wheels 656 without imposing any appreciable resistance to the rotation of such gear wheels, the spring also tending to rock forwardly the upwardly extending arm of the bell crank 651. If any of the feelers contact an unmutilated tooth of its gear 656, the rocking movement of the cross bar 655 and its toggle connection is blocked, and the upper end of the bell crank 651 remains offset from the lower edge of the skeleton cam 650, thereby enabling a spring 660 on the crank shaft 648 to maintain the cam-supporting arm 649 lowered, and through the rod 646, to press the dog 644 into effective position with its tooth entered in the aperture 643 of the branch 641 of the clear signal printing key, thus locking the key against depression, to indicate that the cross totalizer is not clear.

Restoration of the numeral wheels of the cross totalizer to zero by the successive depression of the corresponding numeral keys in the proper order while the machine is conditioned for subtraction, for example, results in positioning the abbreviated teeth of the gears 656 in registry with the feelers 658, whereupon gravity assisted by the spring 659, rocks the cross-bar 655 counter-clockwise (Fig. 31), the feelers entering the spaces formed by mutilating the teeth of the gear 656, which rocking movement permits the bell crank 651 to swing forwardly to position its upwardly extending arm in the same plane with the lower edge of the skeleton cam 650.

The cam is so adjusted on the arm 649 that by the time the master wheel 238, traveling with the key carriage, has come into mesh with the units wheel of the cross totalizer, the cam, which also travels with the key carriage, is within one step of escaping to the right of the free end of the upwardly extending arm of the bell crank 651 on the cross totalizer, and the pick-up means (Figs. 25 and 26), is within one step of being unlatched from a selector 531.

Coincident with the letter spacing operation following the printing of the units digit of the total, and the clearing of the totalizer, the pick-up link 231 is automatically released from the selector 531, freeing the cross totalizer to the action of its return spring 234 which draws the cross totalizer and its truck to the right, and causes the upwardly extending arm of bell crank 651, now in its forward position, to wipe along the lower edge of the skeleton cam 650, raising the latter and its supporting arm 649, against the tension of spring 660, and rocking the crank shaft 648 clockwise (Fig. 31) to disengage the dog 644 from the branch 641 of the clear signal printing key, and to hold it disengaged, to permit depression of the clear signal key.

The entry of the first digit of a succeeding item, into the cross totalizer, rotates its gear wheel 656 associated with the numeral wheel on which such digit is entered, and the unmutilated tooth of such gear wheel adjacent the mutilated tooth crowds the corresponding feeler 658 and the cross bar 655 outwardly, to rock the bell crank 651 rearwardly to the position shown in Fig. 31, wherein its upwardly extending arm is offset relatively to the skeleton cam 650, allowing the cam to rock downwardly and enabling the spring 660, through the train of connections set forth, to restore the dog 644 to locking position.

A dog 661, similar to the dog 644, is likewise pivoted to the cover plate, and extends forwardly along the opposite side of the clear signal key branch 641. A spring 662 tends to rock the tooth of the dog 661 into the aperture 643 of the branch. One arm of an elbow lever 663 pivoted at 664 (Fig. 3), to the supporting rail 182, depends into proximity to an ear 665 on the dog 661, the remaining arm of the elbow lever 663 extending substantially horizontally to the right across the right hand cross totalizer frame above the cross totalizer and carrying a skeleton cam 666 adjustably mounted thereon with which co-acts a cross totalizer controlled mechanism (not shown) identical with that just previously described in connection with the left hand cross totalizer shown in Fig. 31, and operating in the same manner with relation to the cam 666 and elbow lever 663 to withdraw the dog 661 from engagement with the branch 641 of the clear signal printing key.

Obviously, the latching dogs 644 and 661 appropriate to the respective cross totalizers should not be simultaneously effective, at a time when it is desired to print the totals and clear either or both cross totalizers, it being immaterial at other times.

Therefore, there is provided means to silence the latching dog 644 or 661 appropriate to the cross totalizer whose total is not to be cleared, such means including a manually settable disabling lever 667 pivoted at 668 to the under surface of the cover plate, the rear end of such disabling lever being bent upwardly to pass through an arcuate slot 669 in the cover plate and between the free forward ends of the dogs 644 and 661. The forward end of the disabling lever 667 is similarly bent upwardly to project through an arcuate limiting slot 670 and terminates in a finger piece, indicia as "L" and "R" being located on the cover plate adjacent opposite ends of the limiting slot 670 to inform the operator of the particular adjusted position occupied by the disabling lever.

A friction spring, as 671 (Fig. 34), may be used to retain the lever in any of its adjusted positions.

The disabling lever, when rocked to either end of its travel, operates to disengage one or the other of the dogs 644, 661 from the branch 641 of the clear signal printing key and hold such dog disengaged.

After clearing the appropriate cross totalizer, the disabling lever may be swung to the opposite limit of its travel to release for operation the dog appurtenant to the cross totalizer which still registers a total, and to silence the dog related to the cleared cross totaalizer.

It will be readily apparent from the foregoing that this invention is most flexible and well adapted to perform the various functions of typewriting and calculating.

Changes may be made in the form and arrangement of the several parts set forth without departing from the spirit and scope of the invention.

What is claimed as new is:

1. In a calculating machine, the combination with a totalizer, and totalizer-actuating mechanism therefor, adapted for relative bodily movement; of state-determining means to variously condition the actuating means; a lever connected with the state-determining means; a tappet shiftably mounted on the lever; a selector between which and the tappet there is relative bodily movement to effect the automatic operation of the lever; a supporting member on the lever engageable by the tappet to retain the tappet effective when contacted by the selector; and means to displace the tappet relatively to its lever without affecting the state-determining means.

2. In a calculating machine, the combination with a totalizer, and totalizer-actuating mechanism adapted for relative bodily movement, the totalizer-actuating mechanism including a clutch member; and selective manipulative devices to differentially control the totalizer-actuating mechanism; of means to control the effectiveness of the totalizer-actuating mechanism, including an arm removably engageable with the clutch member to shift the latter to operative and inoperative positions, respectively, under control of the manipulative devices; and means to disengage the arm from the clutch member.

3. In a calculating machine, the combination with a totalizer; totalizer-actuating mechanism; a state-control means for the totalizer-actuating mechanism to condition the latter for one of two functions; and to separate state-control means to condition the totalizer actuating mechanism to a third state; of indications associated with the respective state-control means; and masking means controlled by one of the state-control means to conceal the indications for the other of said state-control means.

4. In a writing-calculating machine, having totalizers; totalizer-actuating means for the respective totalizers; and settable state-control means individual to the respective totalizer-actuating means; the combination of separate trains of mechanism converging from the several state-control means and terminating in rockers arranged in a group; tappets mounted on the respective rockers for movement relatively thereto, one edge of each tappet being inclined; a selector device between which and the tappets there is relative movement, to enable the selector device to co-act with the tappets and variously set the state-control means according to a predetermined plan; and a normally idle disabling member shiftable towards and from the tappets, one edge of the disabling member adapted to wipe over the inclined edges of the tappets to displace the tappets relatively to their rockers and out of range of the selector device.

5. In a writing-calculating machine totalizer; a master wheel for the totalizer; a differential mechanism; and a train of mechanism to transmit the differential movements of the differential mechanism to the master wheel, the train including normally disengaged clutch members; the combination of a clutch shifter normally connected with the movable clutch member of the clutch device, and shiftable in one plane under control of the differential mechanism; and a selective, manually operable means to rock the clutch shifter in a plane at substantial right angles to the first-named plane, to disengage the shifter from its clutch member, whereby to interrupt transmission of differential movement to the master wheel.

6. In a writing-calculating machine totalizer; a master wheel for the totalizer; a differential mechanism; and a train of mechanism to transmit the differential movements of the differential mechanism to the master wheel, the train including normally disengaged clutch members; the combination of a clutch shifter, including a rotatable element, and a shifting arm pivoted to the rotatable element to rock therewith, said shifting arm also rockable relatively to the said rotatable element; means to normally engage the shifting arm with one of the clutch members; and means to rock the shifting arm relatively to the rotatable element to disengage the arm from its clutch member.

7. In a writing-calculating machine having a totalizer; a master wheel for the totalizer; a differential mechanism; and a train of mechanism to transmit the differential movements of the differential mechanism to the master wheel, the train including normally disengaged clutch members; the combination of a clutch shifter, including a rotatable element, and a shifting arm mounted thereon to rock therewith in one direction, or relatively thereto in another direction; a toe on the shifting arm; and means operable upon the toe to rock the shifting arm relatively to its support to disengage the arm from its clutch member.

8. In a writing-calculating machine having a totalizer; a master wheel for the totalizer; a diffrential mechanism; and a train of mechanism to transmit the differential movements of the differential mechanism to the master wheel, the train including normally disengaged clutch members; the combination of a clutch shifter normally connected with a clutch member, and shifable in planes at substantial right angles to each other; means operable by the differential mechanism to move the clutch shifter in a direction to engage the clutch members; and means to move the clutch shifter in a direction to disengage the shifter from its clutch member; the clutch shifter also including a device to engage and retain the clutch member against displacement when the clutch shifter is disengaged therefrom.

9. In a writing-calculating machine having a carriage; a totalizer; a master wheel; and key-controlled differential mechanism to actuate the master wheel; of state controls automatically settable under the influence of the carriage, and including a train of mechanism including a lever; a tappet having a floating connection with the lever; a selector with which the tappet co-acts to set the train of mechanism when the carriage travels in one direction, and to yield relatively to the lever when the carriage returns; the tappet having a hooked slot; a pin on the lever; a spring connecting the tappet and rocker to normally fit the hooked end of the slot around the pin, and to hold the tappet in position to contact the selector; a slotted arm extending from the tappet; and a stud on the lever passing through the slot in the arm.

10. In a writing-calculating machine having a carriage; a totalizer; a master wheel; and key-controlled differential mechanism to actuate the master wheel; of state controls automatically settable under the influence of the carriage, and including a linkage train of mechanism including a lever; a tappet having a floating connection with the lever; a selector with which the tappet coacts to set the train of mechanism when the carriage travels in one direction, and to yield relatively to the lever when the carriage returns; the tappet having a hooked slot; a pin on the lever; a spring connecting the tappet and lever to normally fit the hooked end of the slot around the pin, and to hold the tappet in position to contact the selector; and guide and connecting means between the tappet and its lever.

11. In a writing-calculating machine, the combination with a carriage; a totalizer; a master wheel therefor; and key-controlled differential mechanism to actuate the master wheel; of state control mechanism automatically settable under the influence of the carriage, and including a linkage terminating at one end in a rocker; a tappet yieldingly mounted on the rocker; a selector to coact with the tappet to set the state control, the tappet having a shoulder thereon; and a slide to displace the tappet relatively to the selector, the shoulder on the tappet adapted to limit the travel of the slide in one direction.

12. In a calculating machine having a traveling carriage, the combination with a totalizer; totalizer-actuating mechanism; a state control means for the totalizer to condition the actuating mechanism for addition and subtraction; and means, separate from the state control means to neutralize the actuating mechanism; of indications to designate the effective positions of the state control means, and thereby the set condition of the totalizer-actuating mechanism; and masking means controlled by the neutralizing means to conceal the indications for the state control means when the neutralizing means is adjusted to its effective position.

13. In a typewriting-calculating machine, having a pair of cross totalizers, each including a clearance indicator and a latch device under control of its clearance indicator; the combination with a single clear sign printing key; of means on the key engageable by either of said latch devices to lock the key against operation; and a manually settable lever adjustable to render either latch device inoperative.

ALFRED G. F. KUROWSKI.

CERTIFICATE OF CORRECTION.

Patent No. 2,214,082. September 10, 1940.

ALFRED G. F. KUROWSKI.

It is hereby certified that error appears in the printed specification of the above numbered patent requiring correction as follows: Page 19, first column, lines 42 and 58, claims 5 and 6 respectively, after "machine" insert the article --a--; same page, second column, line 13-14, claim 8, for "diffrential" read --differential--; line 20, same claim, for "shifable" read --shiftable--; line 42, claim 9, for the word "rocker" read --lever--; line 53, claim 10, strike out "linkage"; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents..